United States Patent
McGrew et al.

(10) Patent No.: US 6,249,585 B1
(45) Date of Patent: *Jun. 19, 2001

(54) PUBLICLY VERIFIABLE KEY RECOVERY

(75) Inventors: David A. McGrew, Westminster; David W. Carman, Glenwood, both of MD (US)

(73) Assignee: Network Associates, Inc, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,682

(22) Filed: Apr. 8, 1997

Related U.S. Application Data

(60) Provisional application No. 60/043,766, filed on Apr. 11, 1997.

(51) Int. Cl.$^7$ ........................................... H04L 9/00
(52) U.S. Cl. .................................................. 380/286
(58) Field of Search ........................ 380/30, 286

(56) References Cited

U.S. PATENT DOCUMENTS

| | | | |
|---|---|---|---|
| 5,557,765 | * | 9/1996 | Lipner et al. ........................ 380/30 |
| 5,745,573 | * | 4/1998 | Lipner et al. ........................ 380/30 |
| 5,768,388 | * | 6/1998 | Goldwasser et al. ................. 380/30 |
| 5,796,830 | * | 8/1998 | Johnson et al. ...................... 380/30 |
| 5,815,573 | * | 9/1998 | Johnson et al. ...................... 380/30 |
| 5,852,665 | * | 12/1998 | Gressel et al. ....................... 380/30 |
| 5,907,618 | * | 5/1999 | Gennaro et al. ..................... 380/30 |
| 5,920,630 | * | 7/1999 | Wertheimer et al. ................ 380/30 |
| 5,937,066 | * | 8/1999 | Gennaro et al. ..................... 380/30 |

OTHER PUBLICATIONS

Eric Verheul, Henk van Tilborg; "Binding the ElGamal Encryption Scheme," http://www.kub.nl/~frw/people/koops/bindtech.htm, ©1996, 2 pages.

Eric Verheul, Henk van Tilborg; "Binding Cryptography. A fraud–detectible alternative to key–escrow proposals," http://www.kub.nl/~frw/people/koops/binding.htm, ©1996, 4 pages.

* cited by examiner

*Primary Examiner*—Salvatore Cangialosi
(74) *Attorney, Agent, or Firm*—Coolet Godward LLP

(57) ABSTRACT

The present invention is a system and method for publicly verifying that a session key determined according to a Diffie-Hellman key exchange can be recovered from information associated with a communication encrypted with the session key. More particularly, the present invention provides recovery information and verification information with the encrypted communication. A recovery agent is able to recover the session key using the recovery information. A verifier, using the verification information, is able to verify that the session key can, in fact, be recovered from the recovery information. Neither the recovery information nor the verification information alone reveal any secret or private information. Furthermore, only the recovery agent is able to recover the session key, and he does so without revealing any other private information. Thus, the verification can be performed by any member of the public.

55 Claims, 14 Drawing Sheets

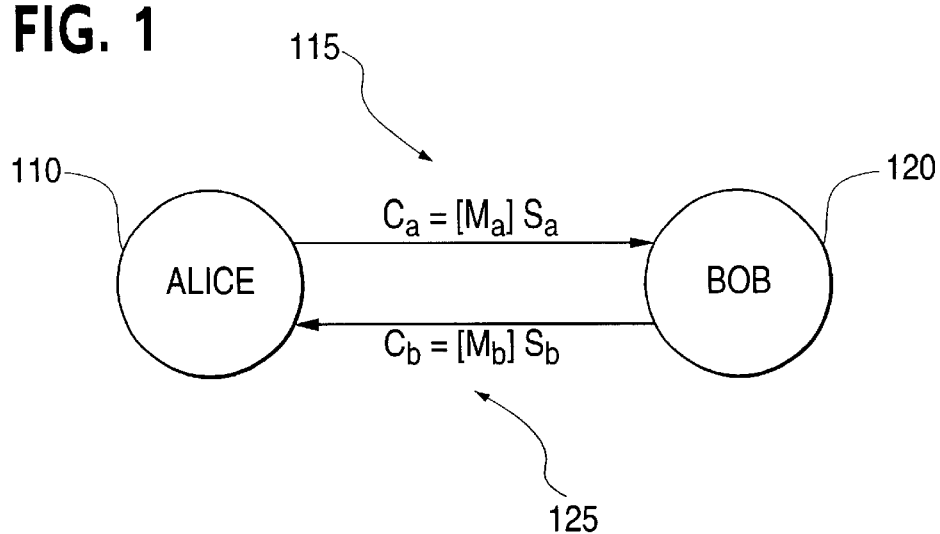
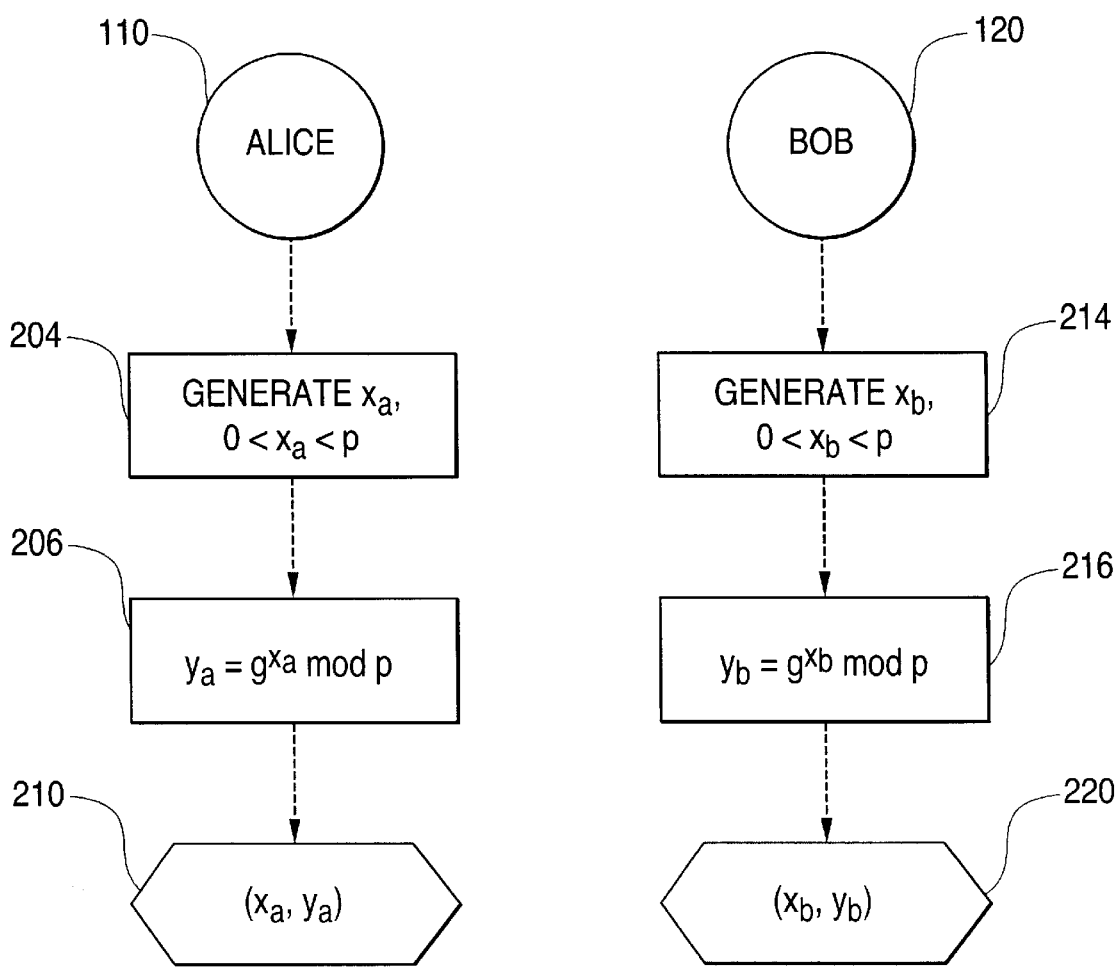

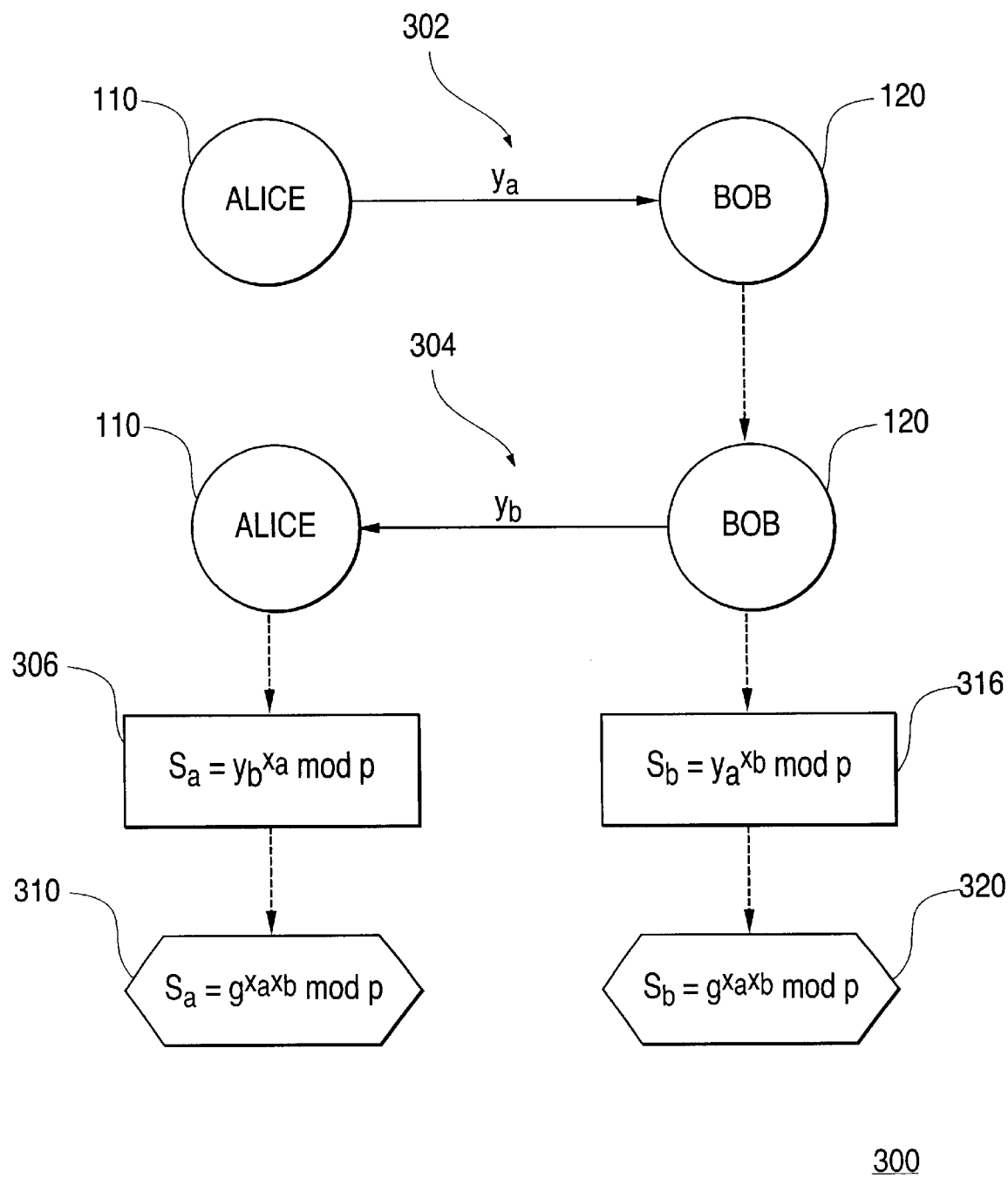

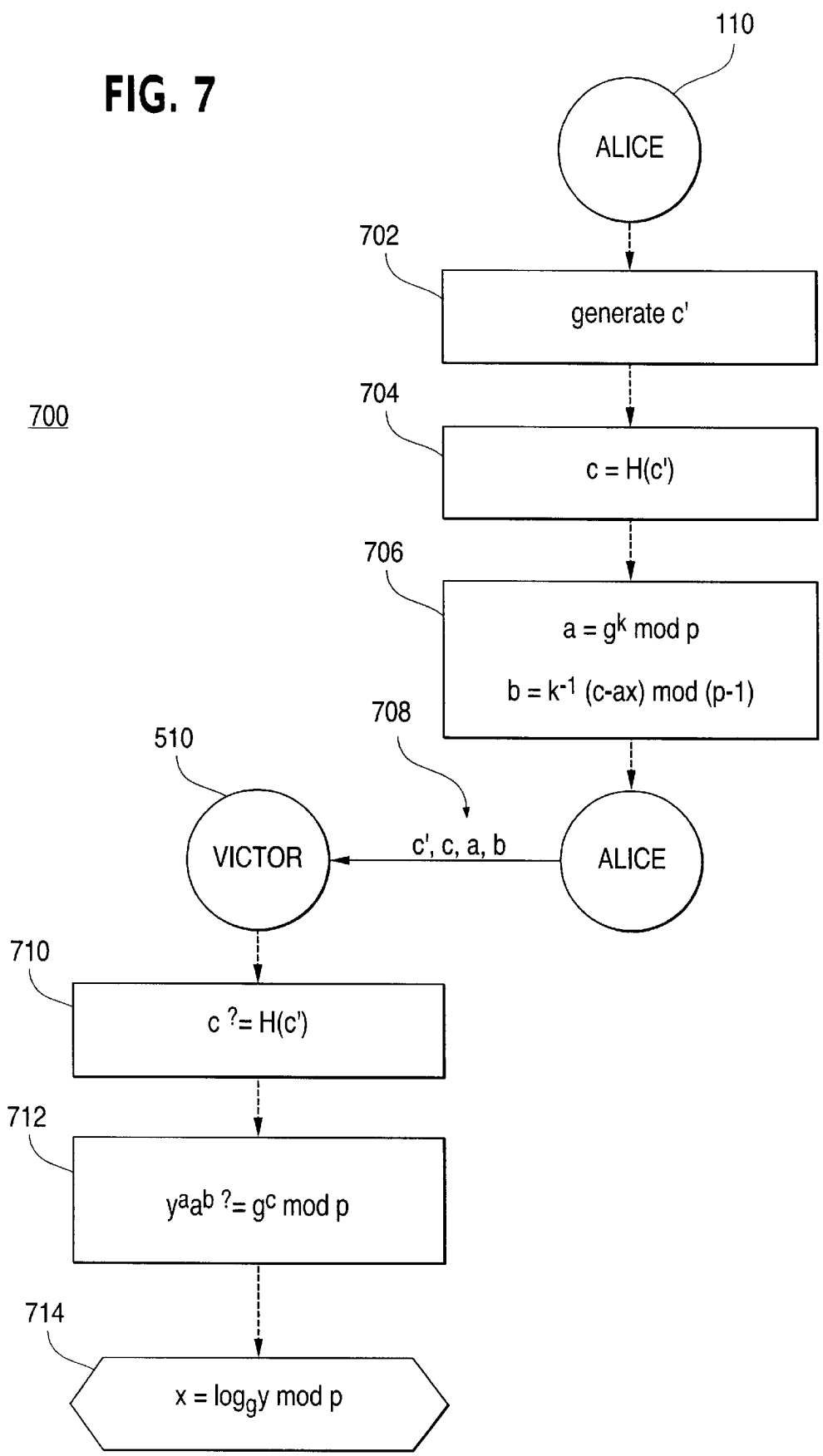

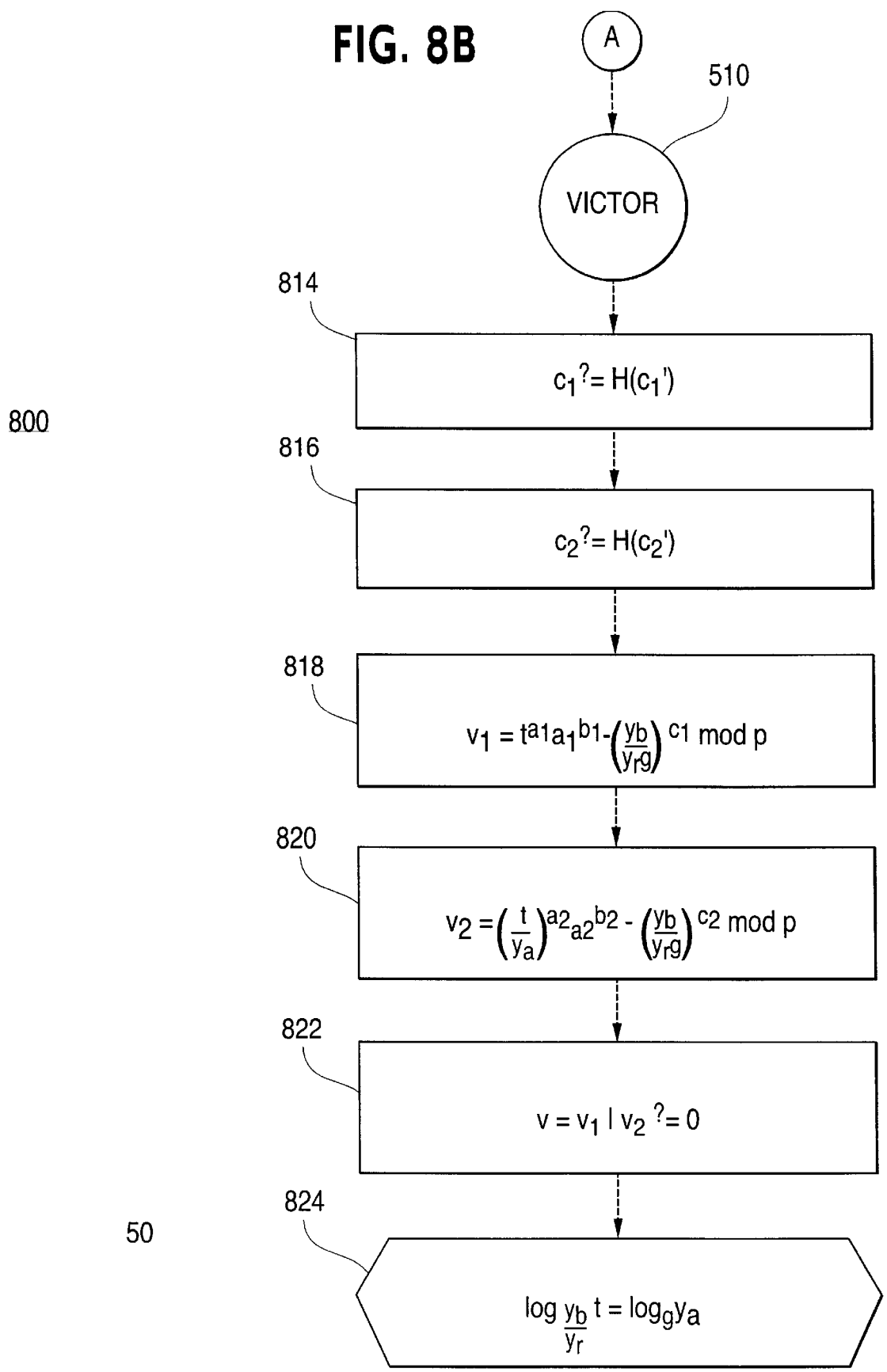

PUBLICLY VERIFIABLE KEY RECOVERY

CROSS REFERENCE TO RELATED APPLICATIONS

This application claims priority to U.S. provision application Ser. No. 60/043,766, which was filed on Apr. 11, 1997, and entitled "Publicly Verifiable Key Recovery."

BACKGROUND OF THE INVENTION

1. Field of the Invention

The present invention relates generally to cryptographic communication systems, and more specifically, toward the verification of information encrypted within a data recovery field.

2. Related Art

Communication between two parties can be secured through the encryption of data using a symmetric session key. One method of generating a session key uses a Diffie-Hellman key exchange. The session key is determined by a sender based on a private key of the sender and a public key of a receiver. The session key is determined by the receiver using a private key of the receiver and a public key of the sender. Because of the way in which the private key and the public key are determined, the sender and the receiver will each determine the identical session key. Once determined, the session key is used to encrypt the communications between the two parties.

Law enforcement officials are naturally concerned with the widespread use of encryption by criminal entities. Accordingly, law enforcement officials require some form of assurance that they will be able to recover the encrypted communications under the proper circumstances, for example, after obtaining a court order. This form of limited access to the encrypted communications is enabled by the creation and use of a data recovery field ("DRF"), and more particularly a key recovery field ("KRF"). The KRF includes the session key encrypted using the public key of a recovery agent (e.g., a trusted data recovery center ("DRC")) or other information that only the recovery agent can use to determine the session key For a law enforcement official to recover the contents of the KRF, the law enforcement official provides the KRF together with a suitable court order to the DRC. If the court order is valid, the DRC uses the KRF to determine the session key and provides it to the law enforcement official, thereby allowing access to the encrypted session.

From the standpoint of the government, this system will only be effective if the session key or other information included within the KRF is the same session key that was used to encrypt the communications. Thus, what is needed is a system and method for verifying that the session key can be recovered from information included within the KRF without revealing any private information.

SUMMARY OF THE INVENTION

The present invention is a system and method for verifying that a session key, or other user secret, can be recovered from public information associated with an encrypted communication in a system using a Diffie-Hellman key exchange protocol. In particular, the present invention provides recovery information to a recovery agent that allows the recovery agent to recover the session key. In addition to the recovery information, the present invention provides verification information that allows a verifier to verify that the session key can be recovered from the recovery information.

A feature of the present invention is that only the recovery agent can recover the session key. Furthermore, any person or device with the proper verification information (and, of course, instructions) can verify that the session key is recoverable from the recovery information. The present invention accomplishes this without revealing any secret information. In other words, the recovery information is publicly verifiable.

BRIEF DESCRIPTION OF THE FIGURES

The foregoing and other features and advantages of the invention will be apparent from the following, more particular description of a preferred embodiment of the invention, as illustrated in the accompanying drawings. In the drawings, like reference numbers indicate identical or functionally similar elements. Additionally, the left-most digit of a reference number identifies the drawing in which the reference number first appears.

FIG. 1 illustrates secure communications between two parties;

FIG. 2 illustrates the generation of a Diffie-Hellman key pair;

FIG. 3 illustrates a Diffie-Hellman key exchange protocol;

FIG. 7 illustrates a non-interactive El Gamal challenge-response protocol;

FIGS. 8A and 8B illustrate a publicly verifiable key recovery challenge-response protocol;

DETAILED DESCRIPTION OF THE PREFERRED EMBODIMENTS

Overview

Figure 4:
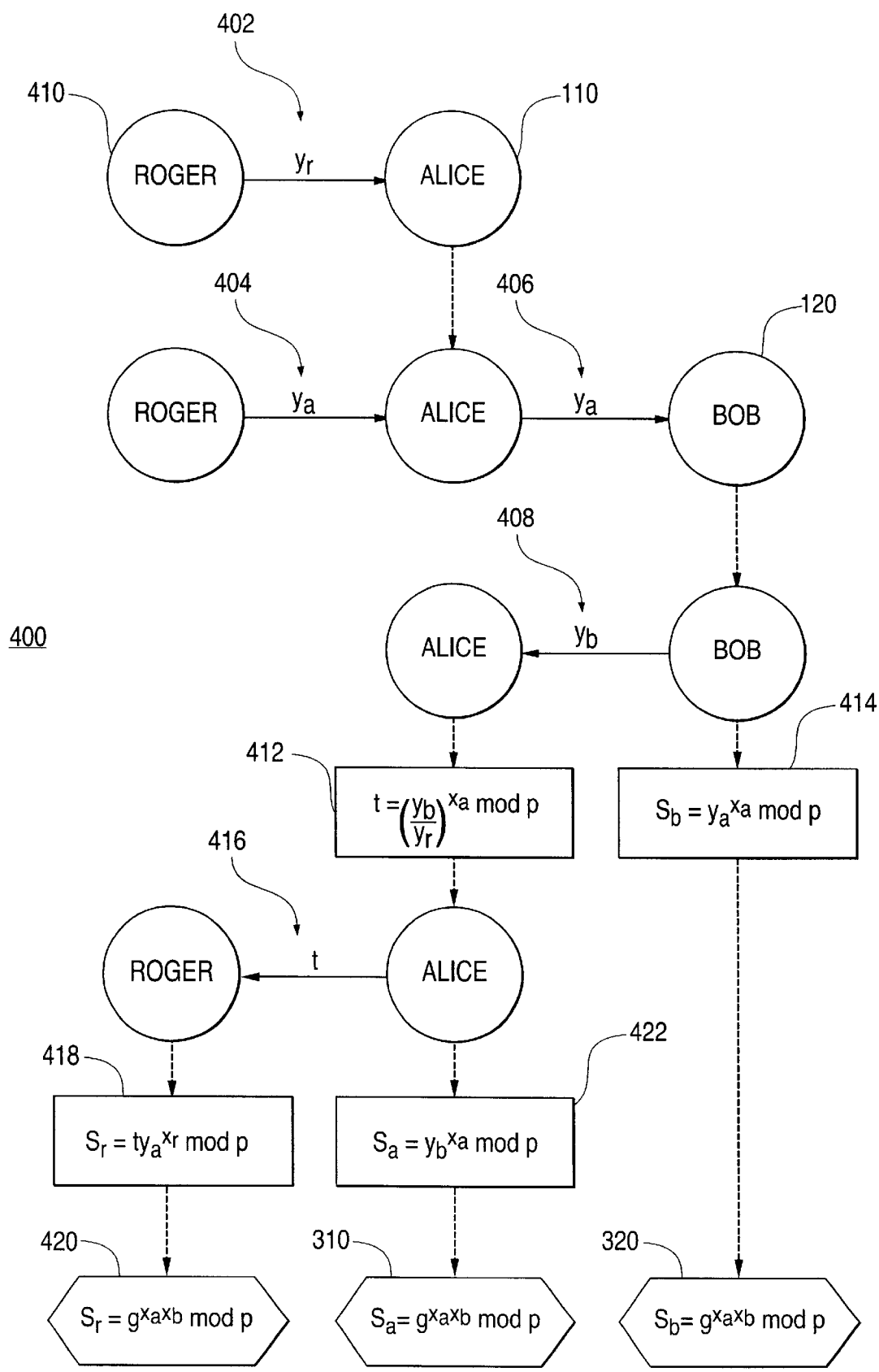
FIG. 4 illustrates a Diffie-Hellman key recovery protocol.

FIG. 1 illustrates secure communications between a first party 110 and a second party 120. For purposes of this discussion, first party 110 is shown in the diagrams as "Alice" and second party 120 is shown in the diagrams as "Bob" following a convention adopted by Bruce Schneier in *Applied Cryptography Second Edition: Protocols, Algorithms, and Source Code in C,* John Wiley & Sons, Inc., N.Y., 1996. The convention as adapted for the following discussion is set forth below in Table I.

TABLE I

| Named Personality | Operational Functionality |
| --- | --- |
| Alice | First Party in cryptographic protocols |
| Bob | Second Party in cryptographic protocols |
| Roger | Recovery Agent |
| Sue | Second Recovery Agent |
| Victor | Verifier |

As shown in FIG. 1, Alice 110 sends Bob 120 an encrypted message 115 (shown as $C_a$ in FIG. 1). In response, Bob 120 sends Alice 120 an encrypted message 125 (shown as $C_b$ in FIG. 1). Encrypted message 115 is a message from Alice, $m_a$, encrypted by a key, $s_a$, belonging to Alice. Encrypted message 125 is a message from Bob, $m_b$, encrypted by a key, $s_b$, belonging to Bob. In a preferred embodiment of the present invention, keys $s_a$ and $s_b$ are sessions keys determined according to a Diffie-Hellman key exchange protocol and are thus equivalent to one another. Other embodiments of the present invention may use similar protocols for determining session keys that may or may not be equivalent to one another. Furthermore, as is discussed in further detail below, still other embodiments employ a single session key, such as for storing confidential data, or several session keys, such as for securely communicating among more than two parties.

Diffie-Hellman Key Exchange Protocol

FIG. 2 and FIG. 3 together illustrate a Diffie-Hellman key exchange protocol 300. FIG. 2 illustrates the generation of a Diffie-Hellman key pair (i.e., a private key and a public key) for Alice 110 and for Bob 120. FIG. 3 illustrates a Diffie-Hellman key exchange protocol 300 that generates a session key for Alice 110 and Bob 120.

The following convention is used in the illustrations to discuss the various protocols. A circle in the illustration (e.g. Alice 110 and Bob 120 in FIG. 2) depicts a party operating in the protocol. A solid line with an arrow connecting two parties indicates a step of sending or providing information from one party to another party in the protocol. A dashed line with an arrow indicates the flow of processing performed by a particular party. A rectangle in the illustration indicates a particular step performed by that particular party. A hexagonal polygon in the illustration indicates a particular result achieved by that particular party obtained through the use of the protocol. A diamond in the illustration indicates a decision step that must be resolved by a particular party in the protocol. The usefulness of this convention will become more apparent by the following discussion.

As mentioned above, FIG. 2. illustrates the generation of a Diffie-Hellman key pair by each of Alice 110 and Bob 120. Diffie-Hellman key pairs are generated, given a public prime number, p, and a public number called the generator, g, according to the following relationship:

$$y = g^x \bmod p \qquad (1)$$

where x is a randomly generated number called the private key such that $0 < x_a < p$, y is a public key, and (x, y) is a Diffie-Hellman key pair.

EQ. (1) represents a one-way function in that computation of the public key, y, is easy given the private key, x; but computation of the private key, x, given the public key, y, is computationally difficult. Herein lies the significance of the Diffie-Hellman key pairs. Alice and Bob can exchange their respective public keys and derive a shared secret key that only they know (as described below).

The generation of a Diffie-Hellman key pair 210 for Alice 110 is now discussed. In a step 204, Alice 110 generates a random private key, $x_a$, according to techniques well known in the art. The private key is bounded by the large public prime, p, as indicated in EQ. (1). In a step 206, Alice 110 determines a public key according to EQ. (1). In particular, Alice 110 determines:

$$y_a = g^{x_a} \bmod p \qquad (2)$$

where $x_a$ is Alice's randomly generated private key such that $0 < x_a < p$, $y_a$ is Alice's public key, and $(x_a, y_a)$ is Alice's Diffie-Hellman key pair.

After determining the public key according to EQ. (2), Alice 110 obtains a Diffie-Hellman key pair 210.

Similar processing is performed by Bob 120. In a step 214, Bob 120 generates a random private key, $x_b$, according to techniques well known in the art. The private key is bounded by the large public prime, p, as indicated in EQ. (1). In a step 216, Bob 120 determines a public key according to EQ. (1). In particular, Bob 120 determines:

$$y_b = g^{x_b} \bmod p \qquad (3)$$

where $x_b$ is Bob's randomly generated private key such that $0 < x_b < p$, $y_b$ is Bob's public key, and $(x_b, y_b)$ is Bob's Diffie-Hellman key pair.

After determining the public key according to EQ. (2), Bob 120 obtains a Diffie-Hellman key pair 220.

Key pairs 210, 220 are not used to encrypt/decrypt all the messages in a communication session. Rather, key pairs 210, 220 are used merely to derive a session key between Alice 110 and Bob 120. This session key is typically a symmetric key which is used to both encrypt and decrypt the messages sent during a particular communication session.

As mentioned above, FIG. 3 illustrates how a session key is determined according to Diffie-Hellman key exchange protocol 300.

In a step 302, Alice 110 provides Bob 120 with her public key. After receiving Alice's public key, Bob 120, in a step 304, provides Alice 110 with his public key. The exchange of public keys can be accomplished according to various techniques well known in the art. For example, Alice 110 can send her public key directly and openly to Bob 120 (and vice versa) via any conventional communication system including, but not limited to telephone, telegraph, facsimile, modem, E-mail, etc. The exchange can also be accomplished using a public directory where owners or a trusted entity publish public keys for use by the general public as is also well known in the art. Thus, the present invention contemplates an exchange of public keys in steps 302, 304 according any known or future technique whereby Alice 110 obtains Bob's public key and whereby Bob 120 obtains Alice's public key.

Anytime after Alice 110 receives or is provided with Bob's public key, in a step 306, Alice 110 determines a Diffie-Hellman session key according to the following relationship:

$$s_a = y_b^{x_a} \bmod p \qquad (4)$$

where $s_a$ is a session key determined by Alice, $x_a$ is Alice's private key, and $y_b$ is Bob's public key.

As a result of the determination of EQ. (4), Alice 110 obtains a session key 310. Another expression can be found for session key 310 by substituting EQ. (3) into EQ. (4) which yields the following relationship:

$$s_a = g^{x_a x_b} \bmod p \qquad (5)$$

where $s_a$ is a session key determined by Alice, $x_a$ is Alice's private key, and $x_b$ is Bob's private key.

Similarly, anytime after Bob 120 receives or is provided with Alice's public key, in a step 316, Bob 120 determines a Diffie-Hellman session key according to the following relationship:

$$s_b = y_a^{x_b} \bmod p \qquad (6)$$

where $s_b$ is a session key determined by Bob, $x_b$ is Bob's private key, and y is Alice's public key.

As a result of the determination of EQ. (6), Bob 120 obtains a session key 320. Another expression can be found for session key 320 by substituting EQ. (2) into EQ. (6) which yields the following relationship:

$$s_b = g^{x_a x_b} \bmod p \qquad (7)$$

where $s_b$ is a session key determined by Bob, $x_a$ is Alice's private key, and $x_b$ is Bob's private key.

Comparing EQ. (5) and EQ. (7) yields the following relationship:

$$s_a = s_b = g^{x_a x_b} \bmod p \qquad (8)$$

As shown by EQ. (8), session keys 310, 320 are equivalent to one another even though neither Alice 110 nor Bob 120 has access to or knowledge of the other's private key. After completing Diffie-Hellman key exchange protocol 300, both Alice 110 and Bob 120 have equivalent session keys 310, 320 whereby they may begin their secure communications.

As mentioned above, law enforcement officials would like to have access to the secure communications between Alice 110 and Bob 120 should either of them be suspected of criminal activities. One method of providing access to the secure communications uses a recovery agent. According to this method, the session key is encrypted with a public key of the recovery agent and placed in a data recovery field ("DRF"), or more particularly but without limitation a key recovery field ("KRF"), that is sent together with the encrypted message. Later, if the need should arise, and upon obtaining proper authorization, the law enforcement officials present the KRF to the recovery agent who uses his private key to recover the session key. The session key is then used by the recovery agent or the law enforcement officials to decrypt the encrypted message. Such a method is discussed in detail in U.S. Pat. Nos. 5,557,346 and 5,557,765, incorporated herein by reference in their entireties. Furthermore, Trusted Information Systems has developed RecoverKey, which is a system that incorporates many of the features disclosed in the above referenced patents.

In addition to providing the recovery agent with means to recover the session key, the present invention provides additional functionality by permitting any third party (i.e. a verifier) to verify that a KRF includes the proper session key, particularly, the session key that was used to encrypt the message. The present invention accomplishes this without revealing any private, or secret, information to the third party.

Diffie-Hellman Key Recovery Protocol

FIG. 4 illustrates a Diffie-Hellman key recovery protocol 400 whereby Alice 110 provides recovery information that permits, or enables, a recovery agent 410 to recover session key 310. Protocol 400 is now described with reference to FIG. 4.

In a step 402, recovery agent 410 (shown in FIG. 4 and referred to herein as "Roger") provides Alice 110 with a public key, $y_r$, which is a portion of his Diffie-Hellman key pair. Roger 410 determines his key pair in a manner similar to that discussed above with respect to Alice 110 and Bob 120 using EQ. (1) to obtain the following relationship:

$$y_r = g^{x_r} \bmod p \qquad (9)$$

where $x_r$ is Roger's randomly generated private key such that $0 < x_r < p$, $y_r$ is Roger's public key, and $(x_r, y_r)$ is Roger's Diffie-Hellman key pair.

Roger 410 provides Alice 110 with his public key, $y_r$, using any known technique including general publication as would be apparent.

In a preferred embodiment of the present invention, in a step 404, Alice 110 provides Roger 410 with her public key, $y_a$. Step 404 may occur only once during the life of Alice's key pair, or each time Alice 110 seeks to secure a communication session. In another embodiment of the present invention, Alice's public key is incorporated into the KRF as will be discussed in further detail below. Regardless of how step 404 specifically operates, Roger 410 ultimately obtains possession of Alice's public key.

In a step 406, Alice 110 provides Bob 120 with her public key, $y_a$, as discussed above with respect to step 302. In a step 408, Bob 120 provides Alice 110 with his public key, $y_b$, as discussed above with respect to step 304. After receiving Alice's public key, Bob 120, in a step 414, determines session key 320 as discussed above with respect to step 316. As far as Bob 120 is concerned, protocol 400 is complete.

Alice 110 and Roger 410, however, have further processing to complete. In a step 412, Alice 110 determines recovery information based on Bob's public key, Roger's public key, and Alice's private key. Specifically, Alice 110 determines the recovery information according to the following relationship:

$$t = (y_b / y_r)^{x_a} \bmod p \qquad (10)$$

where t is the recovery information, $y_b$ is Bob's public key, $y_r$ is Roger's public key, $x_a$ is Alice's private key.

As is well known, $1/x \bmod p$ is the multiplicative inverse of $x \bmod p$.

As mentioned above, the recovery information obtained via EQ. (10) permits Roger 410 to recover session key 310 as will be discussed below.

In a step 416, Alice 110 provides Roger 410 with the recovery information. In one embodiment of the present invention, Alice 110 sends the recovery information to Roger 410 shortly after its determination. In another embodiment of the present invention, the recovery information is provided in a KRF associated with the encrypted message as will be discussed in further detail below. In this embodiment, Roger 410 does not receive the recovery information until a law enforcement official or other individual with proper authority presents the KRF to him for recovery of the session key.

After receiving the recovery information, in a step 418, Roger 410 determines a session key according to the following relationship:

$$s_r = t y_a^{x_r} \mod p \quad (11)$$

where $s_r$ is a session key determined by Roger, t is the recovery information, $y_a$ is Alice's public key, and $x_r$ is Roger's private key.

As a result of the determination of EQ. (11), Roger 410 obtains a session key 420.

Another expression for session key 420 can be found by substituting EQ. (2), EQ. (9) and EQ. (10) into EQ. (11) which yields the following relationship:

$$s_r = (y_b / y_r)^{x_a} (y_a)^{x_r} \mod p = g^{x_a x_b} \mod p \quad (12)$$

where $s_r$ is a session key determined by Roger, $x_a$ is Alice's private key, $y_a$ is Alice's public key, $x_b$ is Bob's private key, $y_b$ is Bob's public key, $x_r$ is Roger's private key, and $y_r$ is Roger's public key.

Comparing EQ. (8) and EQ. (12) yields the following relationship:

$$s_a = s_b = s_r = g^{x_a x_b} \mod p \quad (13)$$

where $s_a$ is a session key determined by Alice, $s_b$ is a session key determined by Bob, $s_r$ is a session key determined by Roger, $x_a$ is Alice's private key, and $x_b$ is Bob's private key.

As shown by EQ. (12), session keys 310, 320,420 are equivalent to one another. Furthermore, EQ. (12) demonstrates that Roger 410 is able to recover session key 310 from the recovery information using Alice's public key and his own private key. No private information (i.e., private keys) was revealed. (Note that Roger 410 knows his own private key, $x_r$.) Importantly, neither Alice, 110 nor Bob 120 have had their respective private keys compromised; only the identical session keys 310, 320 were revealed. Thus, both Alice 110 and Bob 120 are able to continue using their private keys with other parties without fear that their private keys have been compromised.

Diffie-Hellman key recovery protocol 400 is not sufficient, however, to enable or permit any third party to verify that the recovery information can be used to recover session key 310. Only Roger 410 can verify that session key 310 can be recovered from the recovery information. Another protocol is necessary to enable third parties to verify that session key 310 can be recovered from the recovery information.

In the above described scenario, Alice was the sender. It should be noted, however, that the sender could have been Bob instead of Alice. Also, according to the present invention, Bob and Alice could provide recovery information to different recovery agents.

Diffie-Hellman Verifiable Key Recovery

Figure 5:
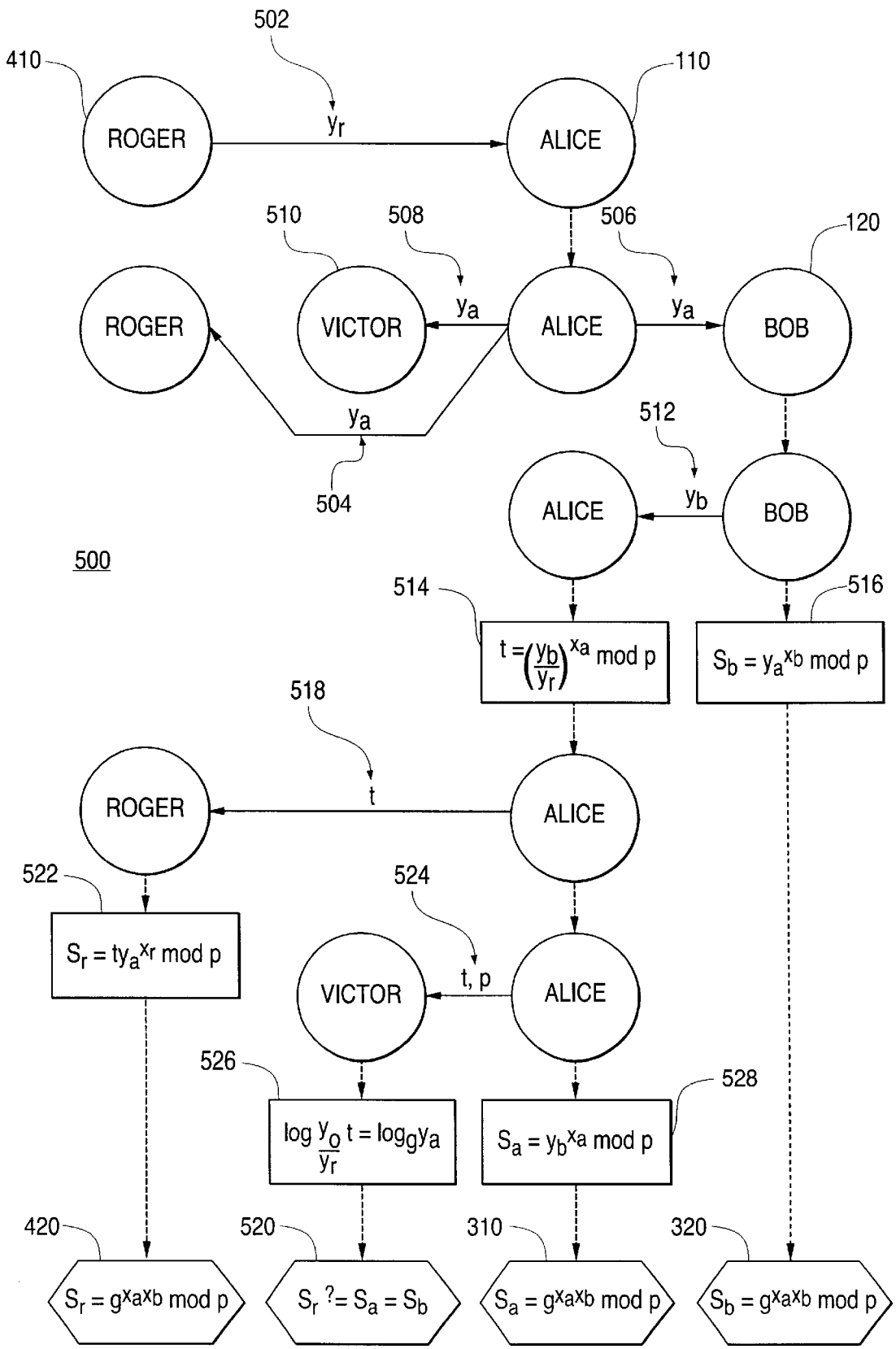
FIG. 5 illustrates a Diffie-Hellman verifiable key recovery protocol.

FIG. 5 illustrates a Diffie-Hellman verifiable key recovery protocol 500 according to the present invention, whereby Alice 110 provides recovery information that permits, or enables, Roger 410 to recover session key 310, and whereby Alice 110 provides verification information that permits, or enables, a verifier 510 to verify that Roger 410 can recover session key 310 from the recovery information. Protocol 500 is now described with reference to FIG. 5.

In a step 502, Roger 410 provides Alice 110 with his public key, $y_r$, as discussed above with reference to step 402. In a step 504, Alice 110 provides Roger 410 with her public key, $y_a$, as discussed above with respect to step 404. In a step 506, Alice 110 provides Bob 120 with her public key, $y_a$, as discussed above with respect to step 302. In a step 508, Alice 110 provides verifier 510 (shown in FIG. 5 and referred herein as "Victor") with her public key, $y_a$, in various manners similar to those used to provide Roger 410 with her public key.

In a step 512, Bob 120 provides Alice 110 with his public key, $y_b$, as discussed above with respect to step 304. After receiving Alice's public key, Bob 120, in a step 516, determines session key 320 as discussed above in step 316. As far as Bob 120 is concerned, in this embodiment of the present invention, protocol 500 is complete.

Alice 110, Roger 410, and Victor 510, however, have further processing to complete. In a step 514, Alice 110 determines recovery information based on Bob's public key, Roger's public key, and Alice's private key as discussed above with respect to 412. In a step 518, Alice 110 provides Roger 410 with the recovery information as discussed above with respect to step 416. After receiving the recovery information, in a step 522, Roger 410 can determine session key 420 as discussed above. At this point, as far as Roger 410 is concerned, protocol 500 is complete.

However, Alice 110 must allow Victor 510 to verify that the recovery information can be used to recover session key 310. In a step 524, Alice 110 provides Victor 510 with the recovery information and verification information so that Victor 510 can verify that session key 310 can be recovered from the recovery information. In a preferred embodiment of the present invention this can be stated a bit differently: Alice 110 must allow Victor 510 to verify that the session key that Roger 410 can derive is the same session key that is used in to communicate with Bob 120 (i.e., EQ. (13) holds).

The verification information provided to Victor 510 depends on the type of proof required by Victor 510, or law enforcement officials, to ensure that Alice 110 has provided Roger 410 with the proper recovery information. The present invention contemplates various verification schemes for verifying that Alice provided Roger 410 with the proper recovery information. Two of these, a challenge-response proof and a zero-knowledge proof, are described in further detail below. Other verification schemes could be used in the present invention as would be apparent.

In any of the verification schemes, Victor's 510 objective is to prove the following relationship:

$$s_r = s_b \tag{14}$$

Substituting EQ. (6) and EQ. (11) into EQ. (14) yields the following relationship:

$$t y_a^{x_r} \bmod p = y_a^{x_b} \bmod p \tag{15}$$

In order for EQ. (15) to be true, the recovery information, t, must be:

$$t = \frac{y_a^{x_b}}{y_a^{x_r}} \bmod p = \frac{g^{x_a x_b}}{g^{x_a x_r}} \bmod p = \frac{y_b^{x_a}}{y_r^{x_a}} \bmod p \tag{16}$$

In order to prove to Victor 510 that EQ. (14) holds (i.e, that the session key Roger 410 derives is the same as the session key shared by Alice 110 and Bob 120), Alice 110 must prove that EQ. (16) holds. However, proving EQ. (16) directly would require Alice 110 to reveal her private key, $x_a$, which she would prefer not to do. Instead, Alice 110 can prove to Victor 510 that EQ. (16) holds without revealing her private key by showing that she knows a simultaneous discrete logarithm. In other words, Alice 110 can show that she knows a number that is the solution to two distinct discrete logarithm problems.

The first discrete logarithm is obtained by taking the logarithm of EQ. (10) with base $y_b/y_r$, which yields:

$$x_a = \log_{y_b/y_r} t \bmod p \tag{17}$$

The second discrete logarithm is obtain by taking the logarithm of EQ. (2), which yields:

$$x_a = \log_g y_a \bmod p \tag{18}$$

Equating EQ. (17) and EQ. (18) yields the following expression:

$$\log_{y_b/y_r} t = \log_g y_a \bmod p \tag{19}$$

In order for Alice 110 to prove that EQ. (16) holds without revealing any private, or secret information, she must show that she knows a solution to both EQ. (17) and EQ. (18). In other words, Alice 110 must demonstrate to Victor 510 that her public key and the recovery information are determined or computed using the same private key, namely, $x_a$.

Both of the verification schemes referred to above, and discussed in further detail below, require that additional information be provided to Victor 510 so that he can verify that the session key can be recovered from the recovery information. This additional information is referred to herein as verification information. Verification information includes any information that is necessary to verify the recovery information. In other words, the verification information must not introduce further ambiguities or uncertainties, or if it does, must do so only within tolerable probabilities (e.g., zero-knowledge proofs).

The present invention contemplates that, in one or more embodiments, the verification information can be identical to the recovery information. In these embodiments, the recovery information can be verified using only public information or information otherwise available to the verifier (e.g., Victor 510), and no additional information would be required. In these embodiments, providing verification information may be equivalent to providing recovery information.

El Gamal Challenge-Response Protocol

Figure 6:
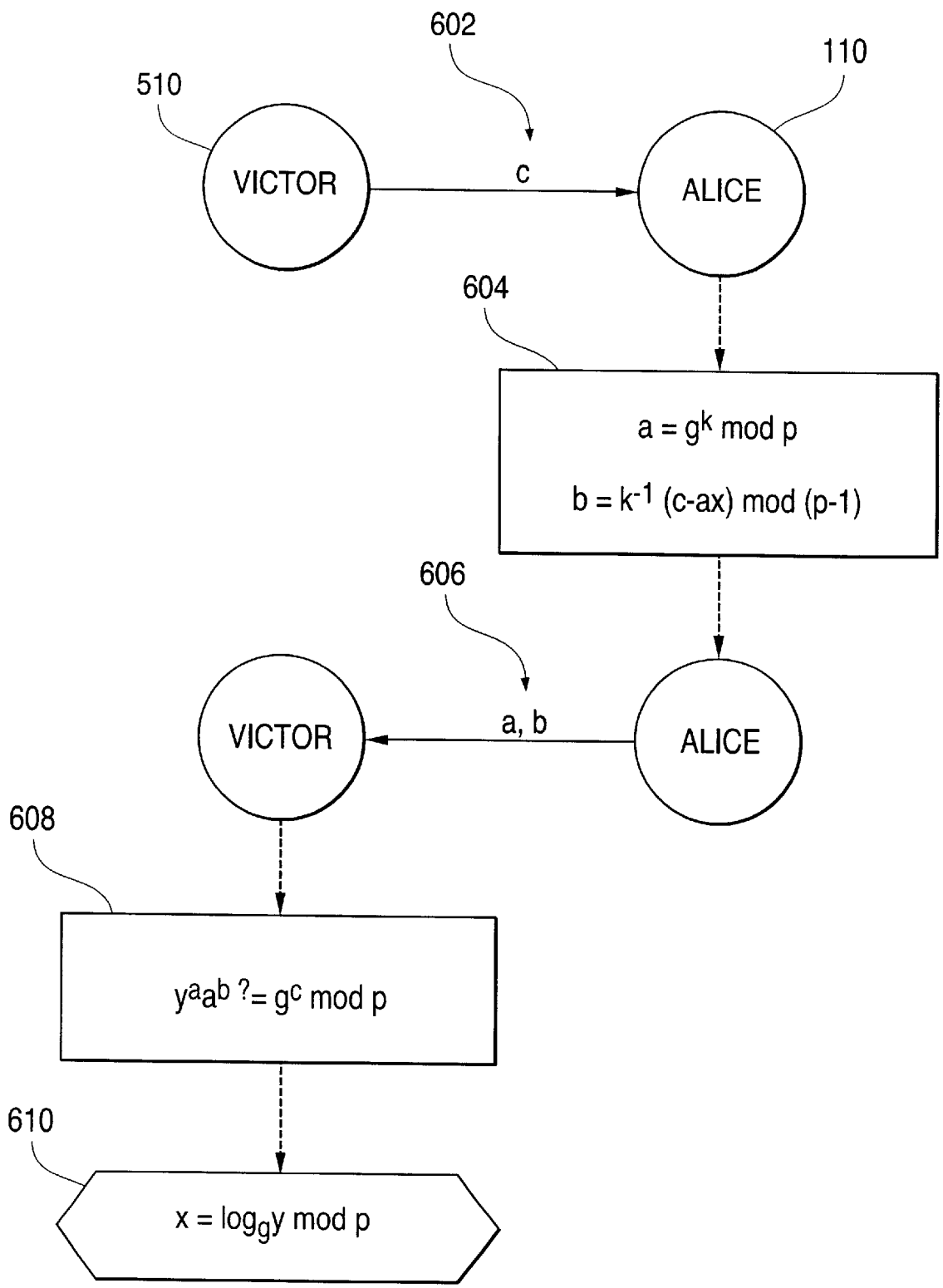
FIG. 6 illustrates an interactive El Gamal challenge-response protocol.

One of the verification schemes Alice 110 can use to prove that she knows a simultaneous discrete logarithm is a challenge-response El Gamal digital signature protocol. Two variations of the El Gamal digital signature protocol are shown in FIG. 6 and FIG. 7 and are described in further detail below.

El Gamal digital signatures operate using private keys that are discrete logarithms of public keys as is well known. The present invention will operate with any of the El Gamal family of digital signature algorithms, including the Digital Signature Algorithm (DSA).

According to the present invention, Alice 110 can prove her knowledge of the simultaneous discrete logarithm by providing two El Gamal digital signatures. This is the preferred embodiment of the present invention because of the simplicity, efficiency, and availability of standard implementations of digital signatures over zero-knowledge proofs.

As is well known, an El Gamal public key is given according to the following relationship:

$$y = g^x \bmod p \tag{20}$$

where
  x is the El Gamal private key,
  y is the El Gamal public key,
  p is the public prime, and
  g is the public generator.

An El Gamal signature (a,b) of an integer, c, by a private key, x, is given by the following relationship:

$$a = g^k \bmod p \quad b = k^{-1}(c - ax) \bmod (p-1) \tag{21}$$

where
  (a,b) is the El Gamal digital signature,
  x is the El Gamal private key,
  y is the El Gamal public key,
  c is the integer, also referred to as a challenge,
  k is a randomly generated integer,
  p is the public prime, and
  g is the public generator.

Verification of the digital signature is accomplished by determining that the following holds:

$$y^a a^b = g^c \bmod p \tag{22}$$

where
  (a,b) is the El Gamal digital signature,
  y is the El Gamal public key,
  c is the challenge,
  p is the public prime, and
  g is the public generator.

If EQ. (22) holds, then Alice 110 must know the discrete logarithm of the public key. In other words, if Alice 110 can determine a digital signature, (a,b), such that EQ. (22) holds for the public key, y, then she must know, the private key, x.

A brief discussion of two variations of a general El Gamal challenge-response protocol is provided prior to discussing how El Gamal protocols are used in various embodiments of the present inventions. These variations include an interactive El Gamal challenge-response protocol and a non-interactive El Gamal challenge-response protocol.

Interactive El Gamal Challenge-Response Protocol

FIG. 6 illustrates an interactive El Gamal Challenge-response protocol 600. In a step 602, Victor 510 issues a challenge to Alice 110. In one embodiment of the present invention, Victor 510 provides Alice 110 with a randomly generated integer, c. In a step 604, Alice 110 computes an El Gamal digital signature according to EQ. (21) using the challenge, the generator, g, the modulus, p, and the public key, y. In a step 606, Alice 110 provides Victor 510 with the digital signature determined in step 604.

In a step 608, Victor 510 verifies that EQ. (22) holds using the digital signature provided by Alice 110 in step 606. If Victor 510 determines that EQ. (22) holds, then Victor 510 is assured that Alice 110 knows the private key, x. In other words, if EQ. (22) holds, Victor 510 is assured that Alice knows the discrete logarithm of the number y, base g, mod p. Specifically, as shown in step 610 of FIG. 6, if EQ. (22) holds, Alice 110 has proven to Victor 510 that she knows the discrete logarithm (i.e., x) of the public key, y.

In practice, El Gamal digital signature protocols replace the challenge, c, with a hash of the challenge, (H(c)), where H(x) is a collision-free hash function. The hash of the challenge is used in place of the challenge itself in order to prevent forgery attacks to the above described protocol.

The above described El Gamal digital signature protocol is referred to as a challenge-response protocol because Victor 510 provides a "challenge" and Alice 110 provides a "response" to the challenge. More particularly, the above described protocol is referred to as an interactive challenge-response protocol because both Victor 510 and Alice 110 are required to "interact" with one another to complete the protocol.

Non-Interactive El Gamal Challenge-Response Protocol

FIG. 7 illustrates a non-interactive El Gamal challenge-response protocol 700. Protocol 700 is non-interactive because Alice 110 and Victor 510 need not interact with one another for Alice 110 to prove that she knows the discrete logarithm. This non-interactive challenge-response protocol is the preferred embodiment of the present invention because it reduces the number of exchanges involved in the protocol as will be apparent from the following discussion. In addition, this embodiment permits any party, not just Victor 510, to verify proof of the knowledge of the discrete logarithm, as will be discussed below.

Referring to FIG. 7, in a step 702, Alice 110 generates a random integer, c'. Any well known procedure for generating random integers can be employed, such as procedures that use Alice's public key, Bob's public key, time, Roger's public key, a certificate, a hash of a public key, or any combination of the above. It should be understood that these examples are provided for purposes of illustration only, and are not limiting.

As discussed above, random integer, c', is also referred to as a challenge. In a step 704, Alice 110 computes a hash of the challenge according to the following:

$$c=H(c') \qquad (23)$$

where c' is a randomly generated integer referred to as a challenge, c is a hash of the challenge, and H(x) is collision-free hash function.

As mentioned above, the hash function is a well known method of preventing forgery attacks. In addition, the hash function permits Alice 110 to generate her own challenge without fear that she will attempt to somehow select a challenge that thwarts EQ. (22). In other words, the hash function prevents Alice 110 from selecting her own value of the challenge in an attempt to spoof the verification process. The fact that Alice 110, and not Victor 510, generates the challenge makes this particular protocol non-interactive.

In a step 706, Alice determines an El Gamal digital signature according to EQ. (21) as:

$$a=g^k \bmod p \quad b=k^{-1}(c-ax) \bmod (p-1) \qquad (24)$$

where (a,b) is the El Gamal digital signature, x is the El Gamal private key, y is the El Gamal public key, c is the hash of the challenge, c', k is a randomly generated integer, p is the public prime, and g is the public generator.

In a step 708, Alice provides the verification information to Victor 510. In this embodiment of the present invention, the verification information includes the challenge, the hash of the challenge, and the digital signature.

In a step 710, Victor 510 computes a hash of the challenge, c', provided by Alice 110 to verify that the computed hash is equivalent to the hash provided by Alice 110. The hash function is non-invertible; thus, it is computationally infeasible for Alice 110 to select a hash of the challenge and then determine the challenge from the hash. By verifying that the hash he computed is the same as the hash provided by Alice 110, Victor 510 can verify that Alice 110 is not attempting to spoof the El Gamal digital signature protocol.

In a step 712, Victor 510 verifies that EQ. (22) holds using the digital signature (a,b) provided by Alice 110 in step 708. If Victor 510 determines that EQ. (22) holds, then Alice 110 has proven to Victor 510 that she knows the discrete logarithm (i.e., x) of the public key, y.

If Victor 510 determines that the computed hash and the hash provided by Alice 110 are equivalent and that EQ. (22) holds, then Victor 510 has verified the El Gamal digital signature protocol.

The discussion above with respect to FIG. 6 and FIG. 7 illustrates the operation of an El Gamal digital signature. The following discussion illustrates the operation of the present invention using two El Gamal digital signatures. Specifically, the following discussion illustrates the use of two non-interactive digital signatures in various embodiments of the present invention.

Publicly Verifiable Key Recovery Using a Challenge-Response Protocol

FIG. 8 illustrates a publicly verifiable key recovery challenge-response protocol 800 according to the present invention. According to the present invention, Alice 110 uses two non-interactive challenge-response protocols 700 to show that she knows the discrete logarithm of two distinct values. See EQ. (17) and EQ. (18). Alice 110 uses a first challenge-response protocol to show that she knows an exponent, α, such that:

$$t=(y_b/y_r)^\alpha \bmod p \qquad (25)$$

where t is the recovery information, $y_b$ is Bob's public key, $y_r$ is Roger's public key, and α is the exponent of which Alice is demonstrating knowledge.

Alice 110 does so by creating a first El Gamal signature, ($a_1$, $b_1$), of a random number, $c_1=H(c_1')$, using the recovery information, t, as the exponent and ($y_b/y_r$) as the generator. This is expressed, using EQ. (24) as:

$$a_1=(y_b/y_r)^{k_1} \bmod p$$

$$b_1=k_1^{-1}(c_1-a_1 x_a) \bmod (p-1) \qquad (26)$$

where ($a_1$, $b_1$) is the first El Gamal digital signature, $y_b$ is Bob's public key, $y_r$ is Roger's public key, $x_a$ is Alice's private key, $c_1$ is the first hash of the first challenge, $k_1$ is a randomly generated integer, and p is the public prime.

The first digital signature is verified using the following expression:

$$t^{a_1} a_1^{b_1}=(y_b/y_r)^{c_1} \bmod p \qquad (27)$$

where ($a_1$, $b_1$) is the first El Gamal digital signature, t is the recovery information, $y_b$ is Bob's public key, $y_r$ is Roger's public key, $c_1$ is first hash of the first challenge, and p is the public prime.

In other words, if EQ. (27) holds, Alice has demonstrated that she knows α.

Alice 110 uses a second challenge response protocol to show that she knows an exponent, β, such that:

$$(t/y_a)=(y_b/y_r g)^{\beta} \bmod p \qquad (28)$$

where t is the recovery information, $y_a$ is Alice's public key, $y_b$ is Bob's public key, $y_r$ is Roger's public key, g is the public generator, and β is the exponent of which Alice is demonstrating knowledge.

Alice does so by creating a second El Gamal signature, ($a_2$, $b_2$), of a random number, $c_2=H(c_2')$, using $t/y_a$ mod p as the public key and ($y_b/y_r g$) mod p as the generator. This is expressed, using EQ. (24) as:

$$a_2=(y_b/y_r g)^{k_2} \bmod p$$

$$b_2=k_2^{-1}(c_2-a_2 x_a) \bmod (p-1) \qquad (29)$$

where ($a_2$, $b_2$) is the second El Gamal digital signature, $y_b$ is Bob's public key, $y_r$ is Roger's public key, $x_a$ is Alice's private key, $c_2$ is the second hash of the second challenge, $k_2$ is a randomly generated integer, g is the public generator, and p is the public prime.

The second digital signature is verified using the following expression:

$$(t/y_a)^{a_2} a_x^{b_2}=(y_b/y_r g)^{c_2} \bmod p \qquad (30)$$

where ($a_2$, $b_2$) is the second El Gamal digital signature, t is the recovery information, $y_a$ is Alice's public key, $y_b$ is Bob's public key, $y_r$ is Roger's public key, $c_2$ is second hash of the second challenge, g is the public generator, and p is the public prime.

In other words, if EQ. (30) holds, Alice 110 has shown that she knows β.

By demonstrating that Alice 110 knows α and β, Alice 110 has demonstrated that she knows the discrete logarithms of EQ. (17) and EQ. (18). In other words, by knowing α and β, Alice 110 has demonstrated that she knows her private key, $x_a$. This is demonstrated by Theorem (1).

Theorem 1. If Alice 110 knows the discrete logarithms α and β, as verified by EQ. (15), then either α=β=$x_a$ or she knows the discrete logarithm of ($y_b/y_r$).

Proof: EQ. (28) is equivalent to the following expression:

$$\frac{t}{y_a} = \frac{(y_b/y_r)^{\alpha}}{g^{x_a}} = \frac{(y_b/y_r)^{\beta}}{g^{\beta}} \bmod p \qquad (31)$$

which can be expressed as:

$$g^{x_a-\beta}=(y_b y_r)^{\alpha-\beta} \bmod p \qquad (32)$$

where:

$$\gamma=x_b-x_r \bmod p-1 \qquad (33)$$

which is the discrete logarithm of ($y_b/y_r$). Taking the discrete logarithm of EQ. (33) yields the following expression:

$$\gamma(\alpha-\beta)=x_a \beta \bmod (p-1) \qquad (34)$$

which can be expressed as:

$$\gamma = \frac{x_a - \beta}{\alpha - \beta} \qquad (35)$$

EQ. (35) has two important cases. If α≠β, then Alice 110 must know the discrete logarithm, γ, of ($y_b/y_r$), because she knows all the other quantities. Otherwise, α=β=$x_a$, and Alice 110 need not know γ.

Theorem 1 demonstrates the impossibility of spoofing the present invention (e.g., by having α≠β). If Alice 110 cannot solve discrete logarithms and determine γ (which is the central assumption underlying the Diffie-Hellmn key exchange), then she can only spoof the system by knowing Bob's private key, $x_b$, and Roger's private key, $x_r$, according to EQ. (33). Even if Alice 110 and Bob 120 collude, Alice 110 cannot spoof the present invention because EQ. (33) still requires Roger's private key.

According to the present invention, a verification function is used to verify that Alice 110 has provided the proper recovery information. This verification function is expressed as:

$$V=v_q V v_2$$

where $$v_1 = (t^{a_1} a_1^{b_1} - (y_b/y_r)^{c_1} \bmod p$$
$$v_2 = (t/y_a)^{a_2} a_2^{b_2} - (y_b/y_r g)^{c_2} \bmod p \quad (36)$$

$(a_1, b_1)$ is the first El Gamal digital signature,
$(a_2, b_2)$ is the second El Gamal digital signature,
t is the recovery information,
$y_a$ is Alice's public key,
$y_b$ is Bob's public key,
$y_r$ is Roger's public key,
$c_1$ is the first hash of the first challenge,
$c_2$ is the second hash of the second challenge,
g is the public generator, and
p is the public prime.

The verification function in EQ. (36) is one means of expressing EQ. (27) and EQ. (30) as a single function. Other expressions of verification functions can be obtained using EQ. (27) and EQ. (30) as would be apparent.

Figure 8A:
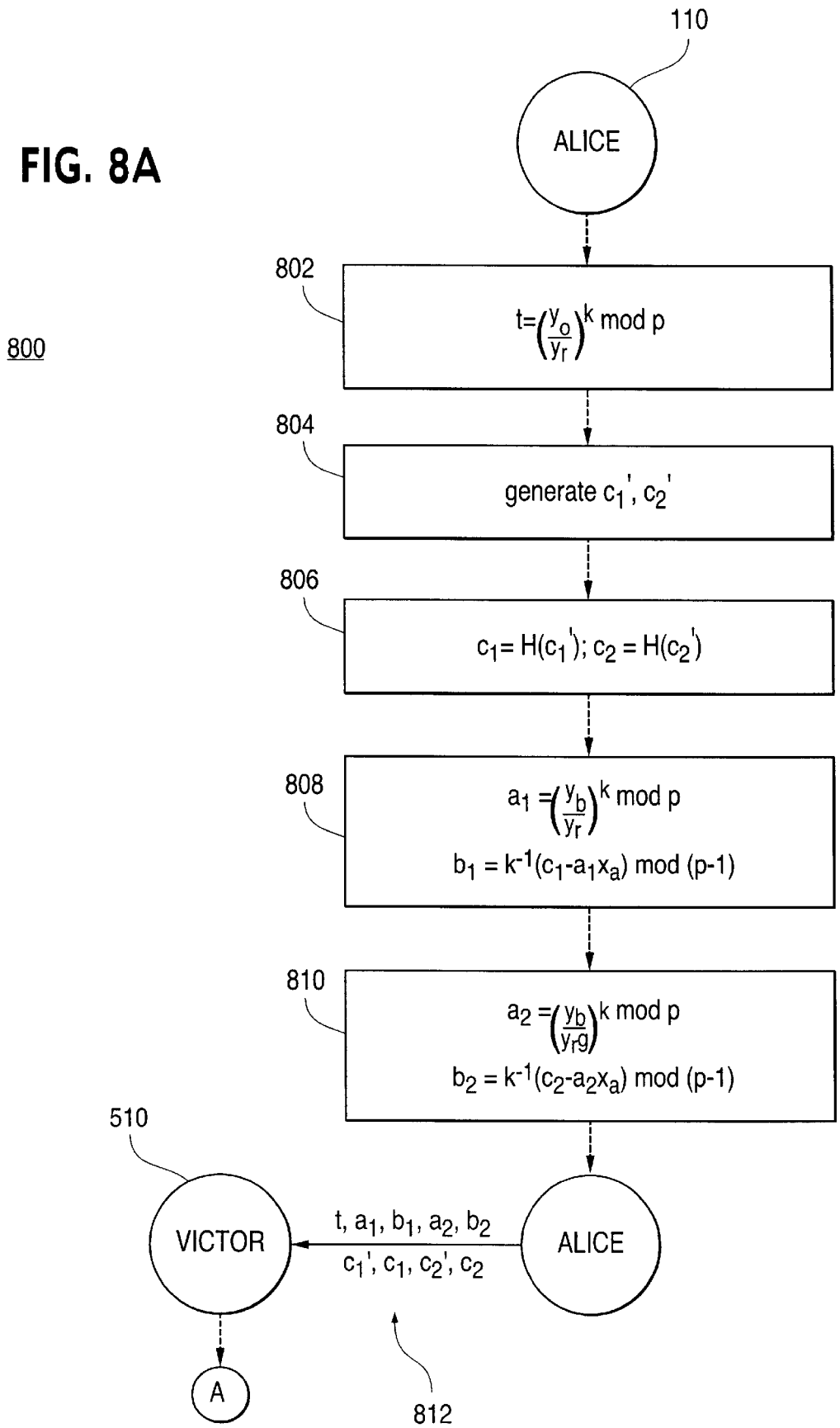

As indicated above, FIG. 8 (shown as FIG. 8A and FIG. 8B) illustrates the operation of a non-interactive challenge-response protocol 800 according to the present invention using two El Gamal digital signatures. Protocol 800 is now described.

In a step 802, Alice 110 determines the recovery information according to the following expression:

$$t = (y_b/y_r)^k \bmod p \quad (37)$$

where:
t is the recovery information,
$y_b$ is Bob's public key,
$y_r$ is Roger's public key, and
k is a randomly generated integer.

In a step 804, Alice 110 generates a first challenge and a second challenge. The first and second challenges are for a first El Gamal digital signature and a second El Gamal digital signature, respectively. Each challenge is a random integer generated according to well known techniques.

In a step 806, Alice 110 determines a first hash of the first challenge and a second hash of the second challenge using a collision-free hash function. As discussed above, the hash function is used to prevent forgery attacks as is well-known. The first and second hashes are determined according to:

$$c_1 = H(c_1') \quad c_2 = H(c_2') \quad (38)$$

where
$c_1'$ is a randomly generated first challenge,
$c_2'$ is a randomly generated second challenge,
$c_1$ is a first hash of the first challenge,
$c_2$ is a second hash of the second challenge, and
H(x) is collision-free hash function.

In a step 808, the first El Gamal digital signature is computed using EQ. (26) as discussed above. In a step 810, the second El Gamal digital signature is computed using EQ. (29) as discussed above.

In a step 812, in one embodiment of the present invention, Alice 110 provides Victor 510 with the recovery information, t, and the verification information, P. In this embodiment of the present invention, the verification information includes: the first El Gamal digital signature, $(a_1, b_1)$; the second El Gamal digital signature, $(a_2, b_2)$; the first hash, $c_1$; the second hash, $c_2$; the challenge, $c_1'$; and the second challenge, $c_2'$.

In a step 814, Victor 510 determines a hash from the first challenge provided by Alice 110, and uses the hash determined from the first challenge to determine whether it is equivalent to the first hash provided by Alice 110. In a step 816, Victor 510 determines a hash from the second challenge provided by Alice 110, and uses the hash determined from the second challenge to determine whether it is equivalent to the second hash provided by Alice 110. As discussed above, step 814 and step 816 enable the challenge-response proof to be performed non-interactively.

In a step 818, Victor 510 determines a first portion of the verification function according to EQ. (36). The first portion of the verification function is found using EQ. (27). In a step 820, Victor 510 determines a second portion of the verification function according to EQ. (36). The second portion of the verification function is found using EQ. (30).

In a step 822, Victor 510 determines whether both the first portion and the second portion equal zero. In one embodiment of the present invention, this is accomplished by "ORing" the first portion with the second portion as indicated in EQ. (36). If the result of ORing the first portion with the second portion is zero, then Victor 510 has verified that Roger 410 can recover session key 310 from the recovery information. In particular, as shown in a result 824, Victor 510 verifies that Alice 110 knows the discrete logarithm that solves EQ. (19).

As discussed above, protocol 800 is a non-interactive challenge-response protocol. Protocol 800 could be easily modified, as would be apparent, to operate as an interactive challenge-response protocol.

FIG. 8 illustrates Alice 110 providing Victor 510 with the verification information. However, as indicated above, in a preferred embodiment of the present invention, this need not be the case. In the preferred embodiment of the present invention Alice 110 may provide the verification information to any party. For example, Alice 110 may provide the verification information to Bob 120, to Roger 410, or other agents. Furthermore, Alice 110 may provide the verification information directly to the law enforcement officials for verification. Still further, Alice 110 may provide the verification information directly to herself for verification. For example, hardware or software associated with Alice 110 may prevent her from sending encrypted messages if the verification information indicates that the proper recovery information has not been provided. In any case, the present invention contemplates that any party may use the verification information to verify, without revealing private information, that Roger 410 may recover session key 310 from the recovery information. Even still further, as will be described in detail below, the verification information and/or the recovery information can be included in a KRF sent with each encrypted message so that any recipient or holder of the encrypted message can verify that session key 310 can be recovered from the recovery information. Even though Victor 510 was used to discuss this embodiment of the present invention, it would be apparent that the discussion applies to other parties that may and can verify that Alice 110 has provided the proper recovery information.

Zero-Knowledge Proof of Simultaneous Discrete Logarithms

In a zero-knowledge proof of a discrete logarithm, the prover (i.e., Alice 110) proves to a verifier (i.e., Victor 510) that she knows a discrete logarithm without revealing any information about what the logarithm is. In a zero-knowledge proof of simultaneous discrete logarithms, the prover proves to the verifier that she knows a single number that solves multiple discrete logarithms problems.

Alice 110 can prove the validity of EQ. (19) by completing a zero-knowledge proof of simultaneous discrete logarithms of Alice's public key, $y_a$, and the recovery information, t. By doing so, Alice 110 is showing that the discrete logarithms are the same, and thus, the discrete logarithm of the recovery information, t, is Alice's private key, $x_a$, according to EQ. (17).

Zero-knowledge proofs are further described in a number of publicly available references, such as D. Chaum, et al., "Demonstrating Possession of a Discrete Logarithm Without Revealing It," *Advances in Cryptology-CRYPTO '86 Proceedings,* pages 200–212, 1986.

Any zero-knowledge proof of simultaneous discrete logarithms could be used in place of the challenge-response proof described above as would be apparent.

Publicly Verifiable Split Key Recovery

The publicly verifiable Diffie-Hellman protocol of the present invention can be modified into an embodiment that incorporates split key recovery. In a system using split key recovery, a key (e.g. private key, session key, etc.) is divided into multiple shares and each share is given to a different recovery agent. Split key recovery is also referred to as key sharing or secret sharing. A general discussion of key sharing is found in U.S. Pat. No. 5,276,737, to Micali, entitled *Fair Cryptosystems and Methods of Use,* issued on Jan. 4, 1994, which is incorporated herein by reference in its entirety.

Figure 9A:
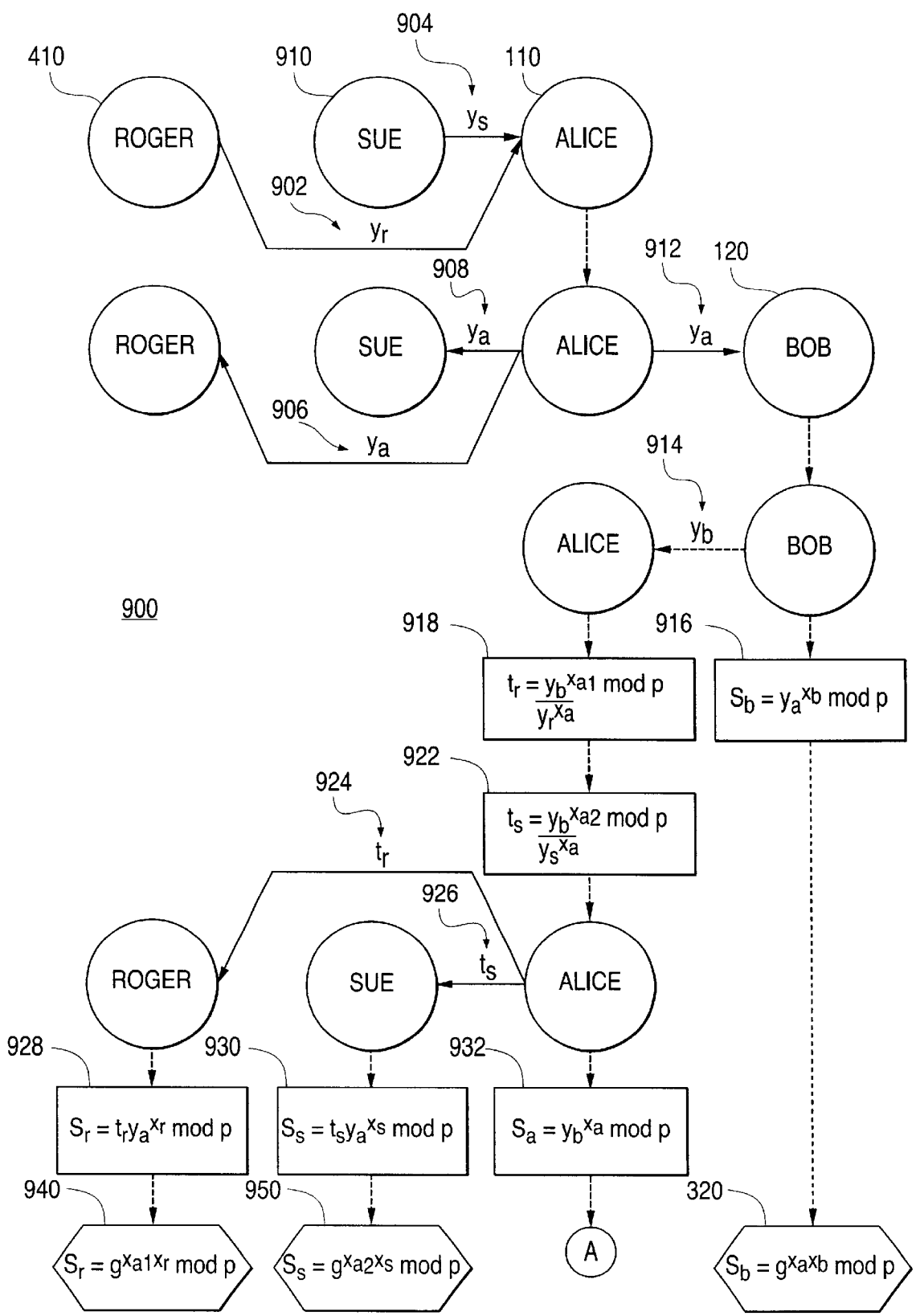
FIGS. 9A and 9B illustrate a publicly verifiable Diffie-Hellman key recovery protocol that incorporates split key recovery.
Figure 9B:
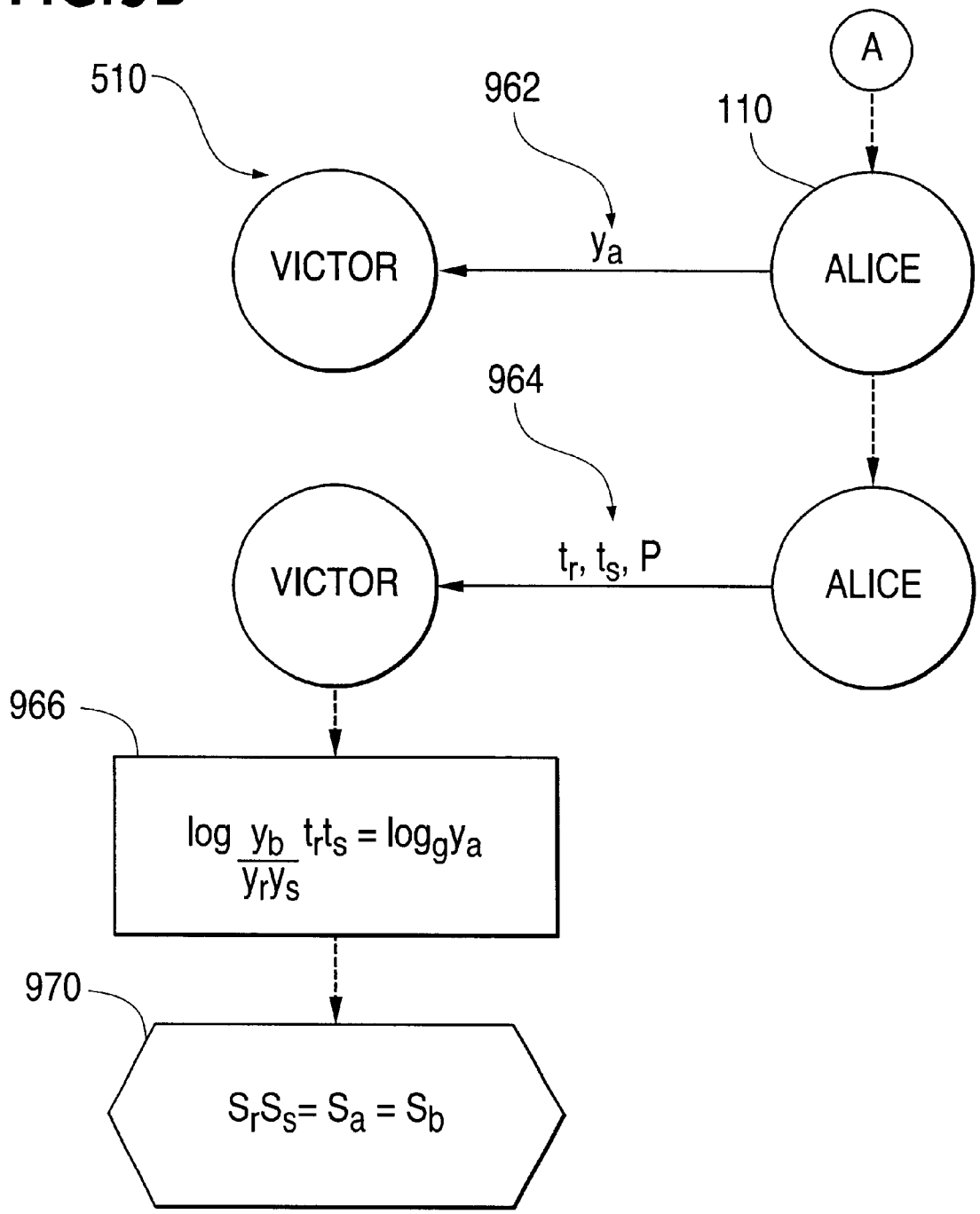

FIG. 9 (shown as FIG. 9A and FIG. 9B) illustrates an embodiment of the present invention that incorporates key sharing. In particular, FIG. 9 illustrates a Publicly Verifiable Split Key Recovery protocol 900. In the description of this embodiment of the present invention, only two recovery agents are used. However, any number of recovery agents could be used as would be apparent. In a step 902, Roger 410 provides Alice 110 with his public key, $y_r$, as discussed above with reference to step 402. In a step 904, a second recovery agent 910 (shown in FIG. 9 and referred to herein as "Sue") provides Alice 110 her public key, $y_s$, in a manner similar to that of Roger 410 in step 902.

In a step 906, Alice 110 provides Roger 410 with her public key, $y_a$, as discussed above with respect to step 404. In a step 908, Alice 110 provides Sue 910 with her public key, $y_a$, in a manner similar to that of Roger 410 in step 906. In a step 912, Alice 110 provides Bob 120 with her public key, $y_a$, as discussed above with respect to step 302.

In a step 914, Bob 120 provides Alice 110 with his public key, $y_b$, as discussed above with respect to step 304. After receiving Alice's public key, Bob 120, in a step 916, determines session key 320 as discussed above in step 316. As far as Bob 120 is concerned, in this embodiment of the present invention, protocol 500 is complete.

Alice 110, Roger 410, Sue 910, and Victor 510, however, have further processing to complete. In a step 918, Alice 110 determines recovery information to be provided to Roger 410. In a step 922, Alice 110 determines recovery information to be provided to Sue 910. Before discussing how this recovery information is determined, some discussion of key sharing is provided.

A general principle of key sharing is that in some cases the key can be only recovered from all the individual shares. In other cases, the key can be recovered from a subset of the individual shares. Typically, the key cannot be recovered from a single share. According to one embodiment of the present invention, this is expressed by the following:

$$s_r s_s \bmod p = s_a = s_b \quad (39)$$

where:

$s_r$ is Roger's share of the session key, $s_s$ is Sue's share of the session key, $s_a$ is the session key computed by Alice, $s_b$ is the session key computed by Bob, and p is the public generator.

In one embodiment of the present invention, shares of the session key are determined by Alice 110 according to the following equation:

$$s_i = y_b^{x_{ai}} \bmod p \quad (40)$$

where:

$$x_a = \sum_{i=1}^{N} x_{ai} \bmod p \quad (41)$$

$s_i$ is the $i^{th}$ share of the session key, $y_b$ is Bob's public key, $x_{ai}$ is the $i^{th}$ randomly generated component of Alice's private key, N is the number of recovery agents, and p is the public generator.

In the embodiment of FIG. 9 with two recovery agents, EQ. (40) and EQ. (41) reduce to the following expressions:

$$s_r = y_b^{x_{a1}} \bmod p$$

$$s_s = y_b^{x_{a2}} \bmod p \quad (42)$$

and $$x_a = x_{a_1} + x_{a_2} \quad (43)$$

where:

$s_r$ is Roger's share of the session key, $s_s$ is Sue's share of the session key, $y_b$ is Bob's public key, $x_a$ is Alice's private key, $x_{a1}$ is the first component of Alice's private key, $x_{a2}$ is the second component of Alice's private key, and p is the public generator.

The shares given in EQ. (42) can also be expressed as:

$$s_r = t_r y_r^{x_a} \bmod p$$

$$s_s = t_s y_s^{x_a} \bmod p \quad (44)$$

where:

$s_r$ is Roger's share of the session key, $s_s$ is Sue's share of the session key, $t_r$ is recovery information provided to Roger, $t_s$ is recovery information provided to Sue, $y_r$ is Roger's public key, $y_s$ is Sue's public key, $x_a$ is Alice's private key, and p is the public generator.

Solving EQ. (45) for the respective recovery information yields:

$$t_r = \frac{y_b^{x_{a1}}}{y_b^{x_a}} \bmod p \qquad (45)$$

$$t_s = \frac{y_b^{x_{a2}}}{y_s^{x_a}} \bmod p \qquad (46)$$

where:

$t_r$ is recovery information provided to Roger,
$t_s$ is recovery information provided to Sue,
$y_r$ is Roger's public key,
$y_s$ is Sue's public key,
$y_b$ is Bob's public key,
$x_a$ is Alice's private key,
$x_{a1}$ is the first component of Alice's private key,
$x_{a2}$ is the second component of Alice's private key, and
p is the public generator.

In step 918, Alice 110 determines Roger's recovery information, $t_r$, using Bob's public key, Roger's public key, and Alice's private key according to EQ. (45). In step 922, Alice 110 determines Sue's recovery information, $t_s$, using Bob's public key, Roger's public key, and Alice's private key according to EQ. (46).

In a step 924, Alice 110 provides Roger's recovery information, $t_r$, to Roger 410 as discussed above with respect to step 416. In a step 926, Alice 110 provides Sue's recovery information, $t_s$, to Sue 910 in a manner similar to that of Roger 410 in step 924.

The recovery agents Roger 410 and Sue 910 can recover their respective share of session key 310 using EQ. (11) which can be expressed as:

$$s_r = t_r y_r^{x_a} \bmod p = t_r g^{x_r x_a} \bmod p = t_r y_a^{x_r} \bmod p \qquad (47)$$
$$s_s = t_s y_s^{x_a} \bmod p = t_s g^{x_s x_a} \bmod p = t_s y_a^{x_s} \bmod p$$

where:

$s_r$ is Roger's share of the session key,
$s_s$ is Sue's share of the session key,
$t_r$ is recovery information provided to Roger,
$t_s$ is recovery information provided to Sue,
$y_r$ is Roger's public key,
$y_s$ is Sue's public key,
$x_a$ is Alice's private key, and
p is the public generator.

Thus, Roger 410 can determine his share of session key 310 from his recovery information, his private key, and Alice's public key. Sue 910 can determine her share of session key 310 from her recovery information, her private key, and Alice's public key.

As a result of step 928, Roger 410 obtains a share 940 of session key 310. As a result of step 930, Sue 910 obtain a share 950 of session key 310. According to key sharing, session key 310 is recovered from shares 940, 950 according to:

$$s_r s_s = t_r y_a^{x_r} t_s y_a^{x_r} = \frac{y_b^{x_{a1}} y_a^{x_r}}{y_r^{x_a}} \frac{y_b^{x_{a2}} y_a^{x_s}}{y_s^{x_a}} = y_b^{(x_{a1}+x_{a2})} = y_b^{x_a} = s_a \qquad (48)$$

where:

$s_r$ is Roger's share of the session key,
$s_s$ is Sue's share of the session key,
$s_a$ is Alice's session key,
$t_r$ is recovery information provided to Roger,
$t_s$ is recovery information provided to Sue,
$y_r$ is Roger's public key,
$y_s$ is Sue's public key,
$y_b$ is Bob's public key,
$x_a$ is Alice's private key,
$x_{a1}$ is the first component of Alice's private key,
$x_{a2}$ is the second component of Alice's private key, and
p is the public generator.

As shown in EQ. (48), session key 310 can be obtained from shares 940, 950 held by the recovery agents, Roger 410 and Sue 910.

The present invention adds the feature of public verification to key sharing. According to the present invention, Alice 110 provides Victor 510 verification information that verifies that the recovery information provided to Roger 410 and Sue 910 can be used to recover session key 310 without revealing any private information. In order to do so, a discrete logarithm similar to that in EQ. (19) must be determined for this key sharing embodiment.

Substituting EQ. (44) into EQ. (39) yields the following:

$$s_r s_s = t_r y_r^{x_a} t_s y_s^{x_a} \bmod p = y_b^{x_a} \bmod p \qquad (49)$$

where:

$s_r$ is Roger's share of the session key,
$s_s$ is Sue's share of the session key,
$t_r$ is recovery information provided to Roger,
$t_s$ is recovery information provided to Sue,
$y_r$ is Roger's public key,
$y_s$ is Sue's public key,
$y_b$ is Bob's public key,
$x_a$ is Alice's private key, and
p is the public generator.

EQ. (48) can be expressed as:

$$t_r t_s = (y_b/(y_r y_s))^{x_a} \bmod p \qquad (50)$$

where:

$t_r$ is recovery information provided to Roger,
$t_s$ is recovery information provided to Sue,
$y_r$ is Roger's public key,
$y_s$ is Sue's public key,
$y_b$ is Bob's public key,
$x_a$ is Alice's private key, and
p is the public generator.

EQ. (50) can be used to obtain the discrete logarithm necessary for verification according to the present invention. More specifically, the discrete logarithm is expressed as:

$$x_a = \log_{y_b/(y_r y_s)} (t_r t_s) \bmod p \qquad (51)$$

The second discrete logarithm is included in EQ. (18). Equating EQ. (18) and EQ. (51) yields the following expression:

$$\log_{y_b/(y_r y_s)}(t_r t_s) = \log_g y_a \bmod p \qquad (52)$$

In order for Alice 110 to prove that EQ. (52) holds without revealing any private, or secret information, she must show that she knows a solution to both EQ. (18) and EQ. (51). In other words, Alice 110 must demonstrate to Victor 510 that her public key, $Y_b$, and the recovery information, $t_r$, $t_s$, are determined or computed using the same private key, namely, $x_a$.

As would be apparent, other methods are available to determine the shares of the session key and/or the recovery information to be provided to the trustees. One feature of the present invention thus described is that only Alice 110 and the respective recovery agent can determine the respective share of the session key from the recovery information provided to that recovery agent. With this in mind, the remaining portion of this embodiment of the present invention is described.

In a step 962, Alice 110 provides Victor 510 with her public key, $y_a$, in a manner similar to that described above with respect to step 508. In a step 964, Alice 110 provides Victor 510 with the recovery information, $t_r$, $t_s$, and verification information necessary for Victor 510 to determine that Roger 410 and Sue 910 can recover session key 310 from the recovery information without revealing any private information.

As discussed above, the verification information provided to Victor 510 depends on the type of proof required by Victor 510, or law enforcement officials, to ensure that Alice 110 has provided Roger 410 and Sue 910 with the proper recovery information. The specific verification information provided to Victor 510 depends on the verification schemes used as described above. Given the description of the challenge-response protocol and the zero-knowledge proof provided above with respect to a single recovery agent, it would be apparent to a person skilled in the art how to implement a proper verification protocol for an embodiment of the present invention employing key sharing.

In a step 966, Victor 510 determines whether EQ. (52) holds according to the selected proof as described above. As a result of this determination, Victor 510 verifies that Alice 110 as provided the proper recovery information and that, in fact, EQ. (52) holds.

Gifford Sealed Key Recovery

Another embodiment of the present invention employs key sealing. Key sealing is another method whereby the role of the recovery agent is distributed to multiple parties. Rather that splitting a key into shares as in key sharing, key sealing involves successively encrypting messages using keys belonging to two or more recovery agents. For example, Alice 110 would encrypt her message with a key belonging to Roger 410 and then encrypt the resulting encrypted message with a key belonging to Sue 910. This can be expressed as:

$$c = E_{k_s}(E_{k_r}(m_a)) \tag{53}$$

where:

c is the resulting ciphertext, $k_s$ is Sue's encryption key, $k_r$ is Roger's encryption key, $m_a$ is Alice's message, and $E_x(y)$ is a encryption function that encrypts y with x.

In a system employing key sealing for key recovery, the resulting ciphertext, c, is provided as the recovery information. The message is recovered from the ciphertext in the reverse order by which the ciphertext is generated. In other words, Sue 910 decrypts c and provides $E_{k_r}(m_a)$ to Roger 410 who decrypts this to provide $m_a$.

Figure 10A:
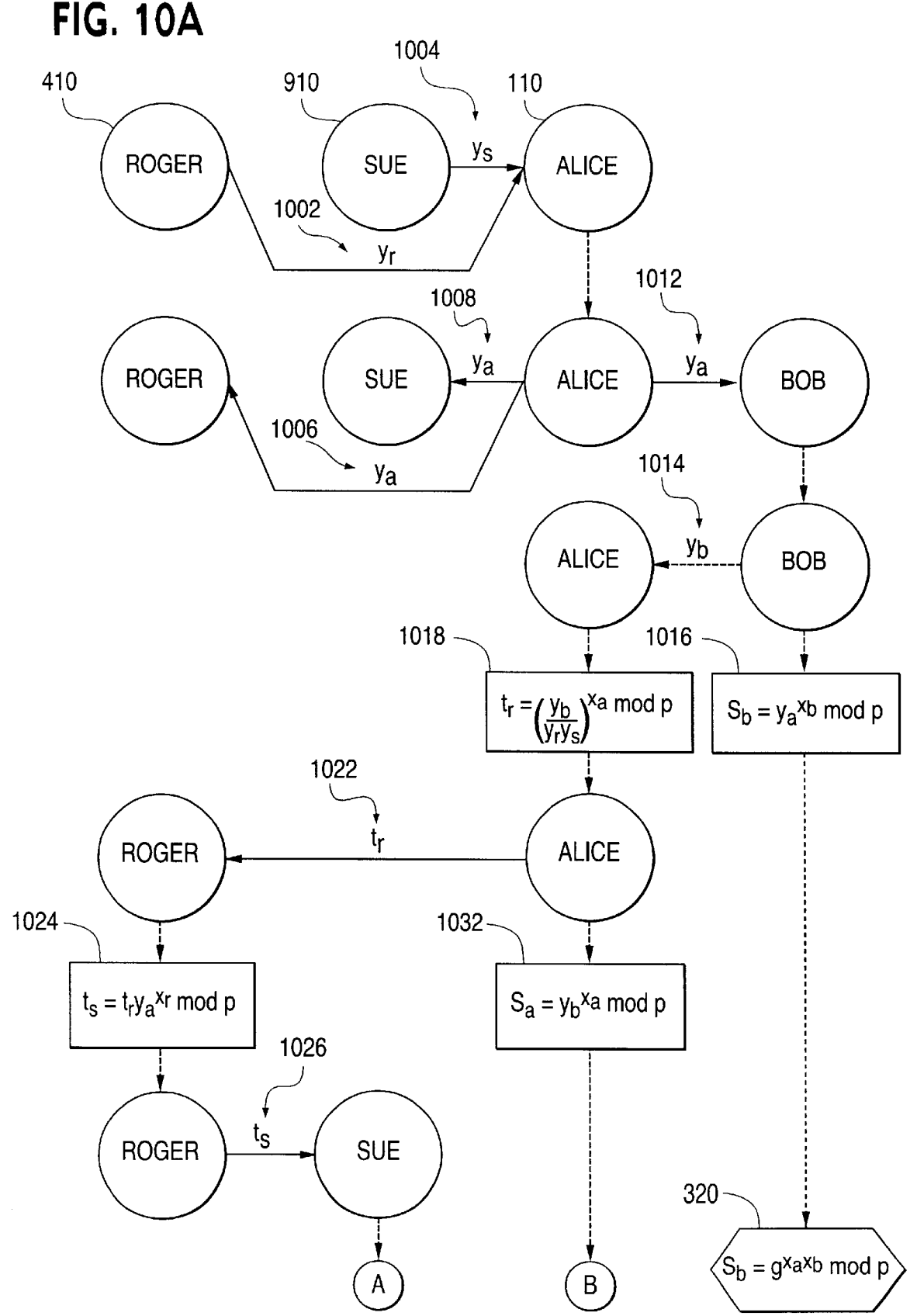
FIGS. 10A and 10B illustrate a publicly verifiable Diffie-Hellman key recovery protocol that incorporates Gifford key sealing.
Figure 10B:
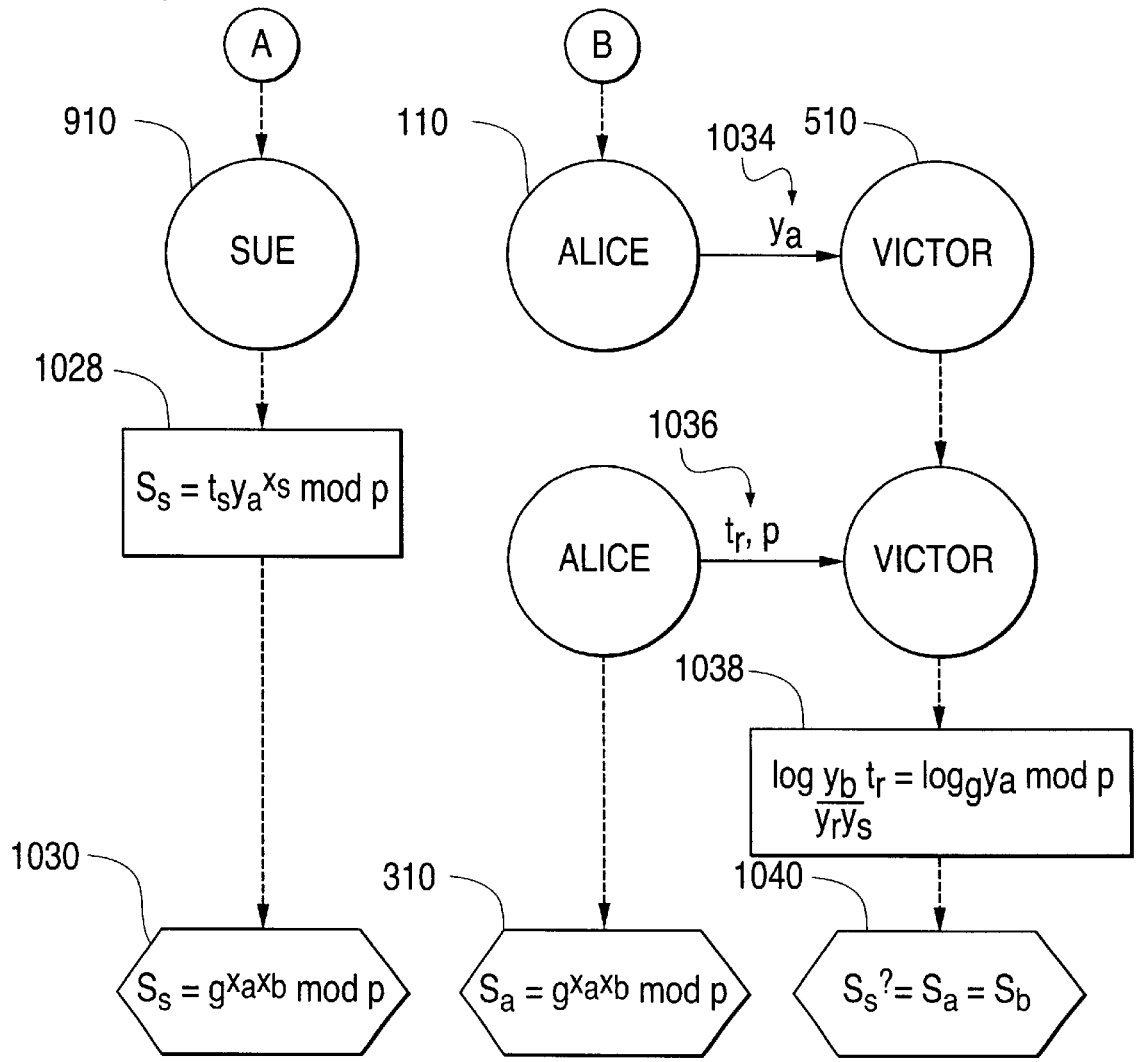

Gifford key sealing can be incorporated into a publicly verifiable key recovery protocol by using a session key in place of the message, $m_a$, above. FIG. 10 illustrates an Publicly Verifiable Gifford Key Sealing Key Recovery protocol 1000 according to one embodiment of the present invention. In the following description of this embodiment of the present invention, only two recovery agents are used. However, as would be apparent, any number of recovery agents could be used. In a step 1002, Roger 410 provides Alice 110 with his public key, $y_r$, as discussed above with reference to step 402. In a step 1004, Sue 910 provides Alice 110 her public key, $y_s$, in a manner similar to that of Roger 410 in step 1004.

In a step 1006, Alice 110 provides Roger 410 with her public key, $y_a$, as discussed above with respect to step 404. In a step 1008, Alice 110 provides Sue 910 with her public key, $y_a$, in a manner similar to that of Roger 410 in step 1006. In a step 1012, Alice 110 provides Bob 120 with her public key, $y_a$, as discussed above with respect to step 302.

In a step 1014, Bob 120 provides Alice 110 with his public key, $y_b$, as discussed above with respect to step 304. After receiving Alice's public key, Bob 120, in a step 1016, determines session key 320 as discussed above in step 316. As far as Bob 120 is concerned, in this embodiment of the present invention, protocol 500 is complete.

Alice 110, Roger 410, Sue 910, and Victor 510, however, have further processing to complete. In a step 1018, Alice 110 determines recovery information to be provided to Roger 410 according to the following:

$$t_r = \frac{y_b^{x_a}}{(y_r y_s)^{x_a}} \bmod p \tag{54}$$

where:

$t_r$ is recovery information provided to Roger, $y_r$ is Roger's public key, $y_s$ is Sue's public key, $y_b$ is Bob's public key, $x_a$ is Alice's private key, and p is the public generator.

Thus, in step 1018, Alice 110 determines Roger's recovery information, $t_r$, using Bob's public key, Roger's public key, Sue's public key, and Alice's private key according to EQ. (54).

In a step 1022, Alice 110 provides Roger's recovery information, $t_r$, to Roger 410 as discussed above with respect to step 416. In a step 1024, Roger 410 determines recovery information to be provided to Sue 910 according to the following:

$$t_s = t_r y_a^{x_r} \bmod p \tag{55}$$

which is equivalent to:

$$t_r y_a^{x_r} = t_r y_r^{x_a} \bmod p = \frac{y_b^{x_a}}{y_s^{x_a}} \bmod p \tag{56}$$

where:

$t_r$ is recovery information provided to Roger by Alice, $t_s$ is recovery information provided to Sue by Roger, $y_r$ is Roger's public key, $y_s$ is Sue's public key, $y_b$ is Bob's public key, $x_r$ is Roger's private key, $x_a$ is Alice's private key, and p is the public generator.

Thus, in step 1024, Roger 410 determines Sue's recovery information, $t_s$, using the recovery information provided to him by Alice 110, Alice's public key, and Roger's private key according to EQ. (55). In a step 1026, Roger 410 provides Sue 910 with Sue's recovery information as discussed above with respect to 1022.

The recovery agents Roger 410 and Sue 910 cannot individually recover session key 310. In fact, only the last recovery agent (in this case Sue 910) actually obtains session key 310. One difference between the protocol according to this embodiment of the present invention and Gifford key sealing is that a specific order need not be followed as discussed above with respect to EQ. (53). For example, as would be apparent from EQ. (54), the same recovery information could be provided by Alice 110 to Sue 910 as opposed to Roger 410. Upon receipt, Sue 910 would determine Roger's recovery information according to:

$$t_r = t_s y_a^{x_s} \bmod p \quad (57)$$

which is equivalent to:

$$t_s y_a^{x_s} = t_s y_s^{x_a} \bmod p = \frac{y_b^{x_a}}{y_r^{x_a}} \bmod p \quad (58)$$

where:

$$t_s = \frac{y_b^{x_a}}{(y_r y_s)^{x_a}} \bmod p \quad (59)$$

$t_s$ is recovery information provided to Sue by Alice,
$t_r$ is recovery information provided to Roger by Sue,
$y_r$ is Roger's public key,
$y_s$ is Sue's public key,
$y_b$ is Bob's public key,
$x_s$ is Sue's private key,
$x_a$ is Alice's private key, and
p is the public generator.

As a result of step 1028, Sue 910 obtains a session key 1030. Note that Roger 410 does not obtain a session key in this embodiment of the present invention unless he does so by other means (e.g. Sue 910 provides him with session key 1030).

The present invention includes the feature of public verification. According to the present invention, Alice 110 provides Victor 510 verification information that verifies that the recovery information provided to Roger 410 can be used by him and the other recovery agents (i.e. Sue 910, etc.) to recover session key 310 without revealing any private information. In order to do so, a discrete logarithm similar to that in EQ. (17) must be determined for this Gifford key sealing embodiment.

This discrete logarithm can be determined by taking the discrete logarithm of EQ. (54) which yields:

$$x_a = \log_{y_b/(y_r y_s)}(t_r) \bmod p \quad (60)$$

where:

$t_r$ is recovery information provided to Roger by Sue,
$y_r$ is Roger's public key,
$y_s$ is Sue's public key,
$y_b$ is Bob's public key,
$x_a$ is Alice's private key, and
p is the public generator.

Alice 110 must prove, without revealing any private information, that she knows a solution to both EQ. (60) and EQ. (18), which is reproduced below as:

$$x_a = \log_g y_a \bmod p \quad (61)$$

In other words, Alice 110 is demonstrating to Victor 510 that her public key, $y_b$, and the recovery information, $t_r$, are determined or computed using the same private key, namely, $x_a$. This can be expressed by equating EQ. (60) and EQ. (61) as:

$$\log_{y_b/(y_r y_s)}(t_r) = \log_g y_a \bmod p \quad (62)$$

where:

$t_r$ is recovery information provided to Roger by Sue,
$y_r$ is Roger's public key,
$y_s$ is Sue's public key,
$y_b$ is Bob's public key, and
p is the public generator.

One feature of the present invention thus described is that only Alice 110 and the combined efforts of the respective recovery agents can determine the respective share of the session key from the recovery information. With this in mind, the remaining portion of this embodiment of the present invention is described.

In a step 1034, Alice 110 provides Victor 510 with her public key, $y_a$, in a manner similar to that described above with respect to step 508. In a step 1036, Alice 110 provides Victor 510 with the recovery information, $t_r$, and verification information necessary for Victor 510 to determine that the recovery agents (i.e., Roger 410 and Sue 910) can recover session key 310 from the recovery information without revealing any private information to Victor 510.

As discussed above, the verification information provided to Victor 510 depends on the type of proof required by Victor 510, or law enforcement officials, to ensure that Alice 110 has provided the proper recovery information. The specific verification information provided to Victor 510 depends on the verification schemes used as described above. Given the description of the challenge-response protocol and the zero-knowledge proof provided above with respect to a single recovery agent, it would be apparent to a person skilled in the art how to implement a proper protocol for an embodiment of the present invention employing key sharing. Based on the protocol used, it would also be apparent as to the verification information required to be provided by Alice 110 to Victor 510.

In a step 1038, Victor 510 determines whether EQ. (62) holds according to the selected proof as described above. As a result of this determination, Victor 510 verifies that Alice 110 as provided the proper recovery information and that, in fact, EQ. (62) holds.

Data Recovery and Data Verification Fields

As mentioned above, in one embodiment of the present invention, the recovery information is concatenated or otherwise combined with an encrypted message to form an object. In a further embodiment of the present invention, the recovery information and the verification information are concatenated or otherwise combined with an encrypted message to form an object. For both embodiments, the resulting object is transmitted from one party to another, and/or stored in some storage device. This latter embodiment is illustrated in FIG. 11.

Figure 11:
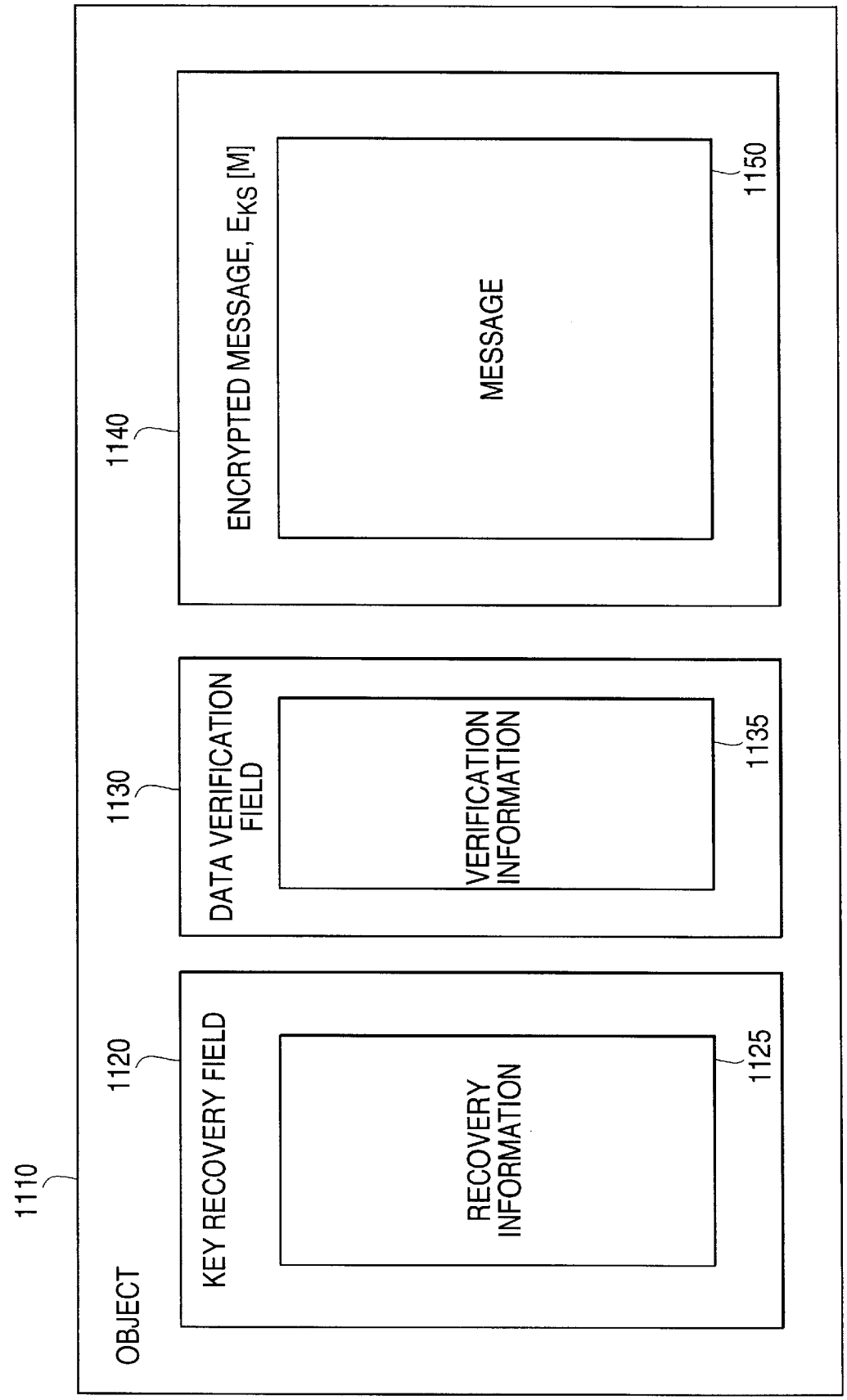
FIG. 11 illustrates a communication message sent according to one embodiment of the present invention.

FIG. 11 illustrates an object 1110 according to this embodiment of the present invention. Object 1110 includes a key recovery field (KRF) 1120, a data verification field (DRV) 1130, and an encrypted message 1140. In a preferred embodiment of the present invention, KRF 1120 includes at least recovery information 1125 and DRV 1130 includes at least verification information 1135. In this embodiment of the present invention, recovery information 1125 and verification information 1135 are included with encrypted message 1140 in object 1110 so that any holder of object 1110 can verify that session key 310 can be recovered from recovery information 1125. In this embodiment of the present invention, proper hashing and other security precautions are taken with respect to object 1110, and in particular to verification information 1130, so that the present invention is not subject to spoofing.

However, neither recovery information 1125 nor verification information 1135 need be encrypted with any type of key. One of the features of the present invention is that recovery information 1125 and verification information 1135 alone do not reveal any secret information. Thus, they do not need to be encrypted.

Other information, while not shown in FIG. 11, may be included within object 1110 in addition to that discussed above. This information may include, for example, any public keys associated with a particular object 1110 including Alice's public key, Bob's public key, Roger's public key, and Sue's public key depending on which of the publicly verifiable key recovery protocols are used.

Implementing Publicly Verifiable Key Recovery

Thus far, this discussion has identified distinct "individuals" that perform the various functions that comprise the embodiments of the present invention. For example, Roger 410 performs the recovery function, and Victor 510 performs the verification function. Having separate individuals perform each of these functions is not necessary and may or may not be desirable. In other words, the functions of Roger 410 and Victor 510 may be together performed by a single individual, or combined with the functions of another individual such as Alice 110 or Bob 120. Thus, while the above description and the drawings indicated that separate individuals are operating within the present invention, it would be apparent to those skilled in the art to combine and/or distribute the functions of various aspects of the present invention among one or more individuals. The following exemplary embodiments of the present invention are not intended to limit the scope of the present invention.

An "individual" need not be an actual living person. The individual may be a particular device, a computer, or a software subroutine that implements the particular functions of the individual. Furthermore, the functions of more that one individual may be implemented together on the same device or in the same software subroutine.

In a preferred embodiment of the present invention, an actual "person" does not perform the above described functions. Rather, hardware and/or software ("hardware/software") associated with the actual person performs these functions transparently. In other words, one or more computers or other electronic devices perform the various functions without the knowledge or interaction of the person(s) associated with the computer(s). In this case, Alice 110 and Bob 120 represent hardware/software that performs the respective functions.

For example, Diffie-Hellman key exchange protocol 300 (shown in FIG. 3) may be implemented so that session key 310 is generated by hardware/software without any action by a person associated with Alice 110 or Bob 120 other than for Alice 110 to send a message to Bob 120 that she desires to be encrypted. The generation of session key 310 according to protocol 300 (as well as the other protocols where session key 310 is generated) and the subsequent encryption of the message would all be transparent to the actual persons involved.

Various other aspects of the protocols discussed above may be handled transparently from the actual persons involved. In fact, for some functions in some embodiments of the present invention, there may not even be a separate individual performing the function. This is particularly true for the functions performed by Victor 510. These functions may be distributed or even duplicated among parties to an encrypted message, such as Alice 110 and Bob 120.

"Alice" as Verifier

In some embodiments of the present invention that implement protocol 800, the verification functions (e.g., steps 814 to 822 in FIG. 8) are performed by hardware/software associated with a sender of the encrypted message, i.e. "Alice". In these embodiments, the functions of Alice 110 and Victor 510 are incorporated together as a single "individual." More specifically, the sender of an encrypted message has associated hardware/software that encrypts messages and verifies them according to protocol 800. This embodiment automatically ensures that messages sent follow protocol 800. In other words, the hardware/software generates a session key, encrypts the message with the session key, generates the required recovery verification information, performs the verification, and sends the encrypted message together with the recovery and verification information.

In another embodiment of the present invention, the sender of the encrypted message has associated hardware/software that merely verifies that the messages include the recovery information. If the message does not include the proper recovery information, then the hardware/software prevents the encrypted message from being sent. This embodiment might be incorporated into, for example, a firewall. As such, the firewall prevents any messages that do not include proper recovery and verification information from being sent from a particular site.

The above description is provided with respect to protocol 800 for ease of discussion. This description applies equally to the other protocols described above as would be apparent.

"Bob" as Verifier

In some embodiments of the present invention that implement protocol 800, the verification functions (e.g., steps 814 to 822 in FIG. 8) are performed by hardware/software associated with a receiver of the encrypted message, i.e. "Bob". In these embodiments, the functions of Bob 120 and Victor 510 are incorporated together as a single "individual." More specifically, the receiver of an encrypted message has associated hardware/software that verifies that the encrypted messages include the recovery information according to protocol 800 and then decrypts the message. This embodiment automatically ensures that messages received were encrypted according to protocol 800. In other words, the hardware/software verifies that the message includes or has been sent with the proper recovery information. This embodiment may or may not notify the proper authorities if an encrypted message is received that does not include the proper recovery information.

In another embodiment of the present invention, the receiver of the encrypted message has associated hardware/ software that merely verifies that the messages include the recovery information. If the message does not include the proper recovery information, then the hardware/software prevents the encrypted message from being decrypted. This embodiment might also be incorporated into a firewall. As such, the firewall could prevent any messages that do not include proper recovery and verification information from entering a particular site. In other words, encrypted messages that do not include the proper recovery information would be blocked from entering the site.

The above description is provided with respect to protocol 800 for ease of discussion. This description applies equally to the other protocols described above as would be apparent.

"Alice" and "Bob" as Verifiers

Figure 12:
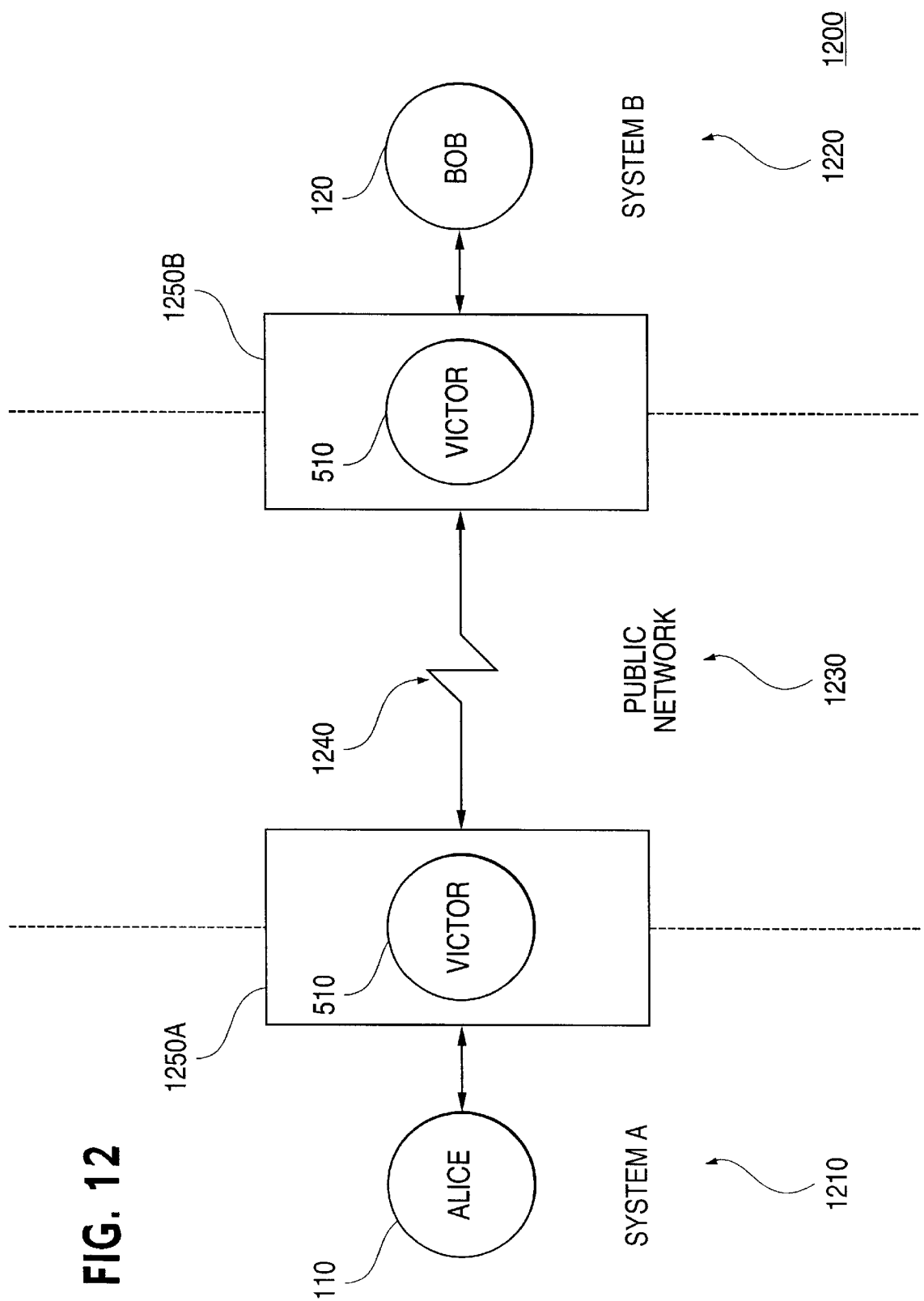
FIG. 12 illustrates a communication channel employing firewalls according to a preferred embodiment of the present invention.

In a preferred embodiment of the present invention, the verification functions are incorporated in devices, such as firewalls, on each end of an encrypted communication channel 1200 as shown in FIG. 12. Encrypted communication channel 1200 includes two parties: Alice 110 and Bob 120. For purposes of this discussion, Alice 110 is a user operating in a system 1210 and Bob 120 is a user operating in a system 1220. Systems 1210, 1220 are either single user systems or networked systems as would be apparent.

Systems 1210, 1220 are each connected to a public communication channel 1230 (e.g., Internet, telephone exchanges, etc.) via a firewall 1250. Firewall 1250A provides certain protective functions between system 1210 and public communication channel 1230. Firewall 1250B provides certain protective functions between system 1220 and public communication channel 1230. In particular, each firewall 1250 includes the verification functions performed by victor 510 for any of the various protocols described above.

In the preferred embodiment of the present invention, encrypted messages are not sent from firewall 1250A unless the messages sent from system 1210 include or are sent with the proper recovery and/or verification information. Likewise, encrypted messages are blocked from entering system 1220 by firewall 1250B unless the messages include or are received with the proper recovery and/or verification information. The same is true in reverse. Encrypted messages are not sent from firewall 1250B unless the messages sent from system 1220 include or are sent with the proper recovery and/or verification information. Encrypted messages are blocked from entering system 1210 by firewall 1250A unless the messages include or are received with the proper recovery and/or verification information.

While the invention has been particularly shown and described with reference to preferred embodiments thereof, it will be understood by those skilled in the relevant art that various changes in form and details may be made therein without departing from the spirit and scope of the invention.

What is claimed is:

1. A method for publicly verifying that information accompanying a message encrypted with a key includes information for recovering the key by a recovery agent, the key being determined according to a Diffie-Hellman key exchange, the method comprising the steps of:

providing, by a first party to the message, recovery information determined from a public key associated with the recovery agent, a public key associated with a second party to the message, and a private key associated with said first party; and providing, by said first party, public verification information that verifies that the key can be recovered from said recovery information without revealing private information.

2. The method of claim 1, further comprising the steps of:

determining, by said first party, the key based on said second party's public key and said first party's private key.

3. The method of claim 1, further comprising the steps of:

determining, by said first party, the key according to the following relationship:

$$s_1 = y_2^{x_1} \bmod p$$

wherein:

$s_1$ is the key determined by said first party, $y_2$ is said second party's public key, $x_1$, is said first party's private key, and p is a large public prime number.

4. The method of claim 1, wherein said step of providing recovery information further comprises the step of:

determining said recovery information according to the following relationship:

$$t = (y_2/y_r)^{x_1} \bmod p$$

wherein:

t is said recovery information, $y_2$ is said second party's public key, $y_r$ is the recovery agent's public key, $x_1$ is the first party's private key, and p is said large public prime number.

5. The method of claim 1, wherein said step of providing verification information comprises the step of:

providing said verification information to said second party.

6. The method of claim 1, wherein said step of providing verification information comprises the step of:

providing said verification information to the recovery agent.

7. The method of claim 1, wherein said step of providing verification information comprises the step of:

providing said verification information to a verifier.

8. The method of claim 1, wherein said step of providing verification information comprises the step of:

providing said verification information in a data verification field associated with the message.

9. A method for publicly verifying that information accompanying a message encrypted with a key includes information for recovering the key by a recovery agent, the key being determined according to a Diffie-Hellman key exchange, the method comprising the steps of:

receiving recovery information determined from a public key associated with the recovery agent, a public key associated with a second party to the message, and a private key associated with a first party; and receiving public verification information that verifies that the key can be recovered from said recovery information without revealing private information.

10. The method of claim 9, wherein said step of receiving verification information comprises the step of:

interactively receiving verification information that verifies that the key can be recovered from said recovery information without revealing private information.

11. The method of claim 10, wherein said step of interactively receiving verification information comprises the steps of:

performing a first challenge-response El Gamal digital signature protocol, said first challenge-response including the steps of:

sending a first challenge; and
receiving a first response according to the following relationship:

$$a_1 = (y_2/y_r)^{k_1} \mod p$$

$$a_1 = (k_1)^{-1}(c_1 - a_1 x_1) \mod p-1$$

wherein:
- $(a_1, b_1)$ is said first response,
- $c_1$ is said first challenge,
- $k_1$ is a first randomly generated integer,
- $y_2$ is said second party's public key,
- $y_r$ is the recovery agent's public key,
- $x_1$ is the first party's private key, and
- p is a large public prime number, and performing a second challenge-response El Gamal digital signature protocol, said second challenge-response including the steps of:
sending a second challenge, and
receiving a second response according to the following relationship:

$$a_2 = \left(\frac{y_2}{y_r g}\right)^{K_2} \mod p$$

$$b_2 = (k_2)^{-1}(c_2 - a_2 x_1) \mod p-1$$

wherein:
- $(a_2, b_2)$ is said second response,
- $c_2$ is said second challenge,
- $k_2$ is a second randomly generated integer,
- $y_2$ is said second party's public key,
- $y_r$ is the recovery agent's public key,
- $x_1$ is the first party's private key, and
- p is a large public prime number;
- wherein said first response and said second response comprise at least a portion of said verification information.

12. The method of claim 9, wherein said step of receiving verification information comprises the step of:
non-interactively receiving verification information that verifies that the key can be recovered from said recovery information without revealing private information.

13. The method of claim 12, wherein said step of non-interactively receiving verification information comprises the steps of:
receiving a first challenge,
receiving a first hash generated from said first challenge,
receiving a first response determined according to a non-interactive challenge-response El Gamal signature protocol as:

$$a_1 = (y_2/y_r)^{k_1} \mod p$$

$$b_1 = (k_1)^{-1}(c_1 - a_1 x_1) \mod p-1$$

wherein:
- $(a_1, b_1)$ is said first response,
- $c_1$ is said first hash of said first challenge,
- $k_1$ is a first randomly generated integer,
- $y_2$ is said second party's public key,
- $y_r$ is the recovery agent's public key,
- $x_1$ is the first party's private key, and
- p is a large public prime number;
receiving a second challenge,
receiving a second hash generated from said second challenge,
receiving a second response determined according to a non-interactive challenge-response El Gamal signature protocol as:

$$a_2 = \left(\frac{y_2}{y_r g}\right)^{k_2} \mod p$$

$$b_2 = (k_2)^{-1}(c_2 - a_2 x_1) \mod p-1$$

wherein:
- $(a_2, b_2)$ is said second response,
- $c_2$ is said second hash of said second challenge,
- $k_2$ is a second randomly generated integer,
- $y_2$ is said second party's public key,
- $y_r$ is the recovery agent's public key,
- $x_1$ is the first party's private key, and
- p is a large public prime number.

14. The method of claim 9, further comprising the step of:
verifying, using said verification information, that the key can be recovered by the recovery agent from the recovery information.

15. The method of claim 14, wherein said step of verifying comprises the step of:
verifying, using said verification information, that the key can be recovered by the recovery agent from the recovery information, said step of verifying performed by said second party.

16. The method of claim 14, wherein said step of verifying comprises the step of:
verifying, using said verification information, that the key can be recovered by the recovery agent from the recovery information, said step of verifying performed by the recovery agent.

17. The method of claim 14, wherein said step of verifying comprises the step of:
verifying, using said verification information, that the key can be recovered by the recovery agent from the recovery information, said step of verifying performed by a verifier.

18. The method of claim 14, wherein said step of verifying comprises the steps of:
accessing a data verification field associated with the message to obtain said verification information; and
verifying, using said verification information, that the key can be recovered by the recovery agent from the recovery information.

19. The method of claim 14, wherein said step of verifying comprises the steps of:
accessing a data recovery field associated with the message to obtain said recovery information and said verification information; and
verifying, using said recovery information and said verification information, that the key can be recovered by the recovery agent from the recovery information.

20. The method of claim 1, wherein said step of providing verification information comprises the step of:
interactively providing verification information that verifies that the key can be recovered from said recovery information without revealing private information.

21. The method of claim 20, wherein said step of interactively providing verification information comprises the step of:
   performing a challenge-response digital signature protocol.

22. The method of claim 20, wherein said step of interactively providing verification information comprises the steps of:
   performing a first challenge-response digital signature protocol; and
   performing a second challenge-response digital signature protocol.

23. The method of claim 20, wherein said step of interactively providing verification information comprises the steps of:
   performing a first challenge-response El Gamal digital signature protocol; and
   performing a second challenge-response El Gamal digital signature protocol.

24. The method of claim 23, wherein said step of performing a first challenge-response comprises the steps of:
   receiving a challenge;
   determining a response based on said challenge and said recovery information; and
   sending said response as at least a portion of said verification information.

25. The method of claim 24, wherein said step of receiving a challenge comprises the step of:
   receiving a random integer from a challenger.

26. The method of claim 24, wherein said step of determining a response comprises the step of:
   determining said response based on said recovery information, said second party's public key, the recovery agent's public key, and said challenge.

27. The method of claim 24, wherein said step of determining a response comprises the step of:
   determining said response according to the following relationship:

$$a_1 = (y_2/y_r)^{k_1} \bmod p$$

$$b_1 = (k_1)^{-1}(c_1 - a_1 x_1) \bmod p-1$$

wherein:
   $(a_1, b_1)$ is said response,
   $c_1$ is said challenge,
   $k_1$ is a randomly generated integer,
   $y_2$ is said second party's public key,
   $y_r$ is the recovery agent's public key,
   $x_1$ is the first party's private key, and
   $p$ is a large public prime number.

28. The method of claim 23, wherein said step of performing a second challenge-response comprises the steps of:
   receiving a challenge;
   determining a response based on said challenge and said recovery information; and
   sending said response as at least a portion of said verification information.

29. The method of claim 28, wherein said step of receiving a challenge comprises the step of:
   receiving a random integer from a challenger.

30. The method of claim 28, wherein said step of determining a response comprises the step of:
   determining said response based on said recovery information, said second party's public key, the recovery agent's public key, and said challenge.

31. The method of claim 28, wherein said step of determining a response comprises the step of:
   determining said response according to the following relationship:

$$a_2 = \left(\frac{y_2}{y_r g}\right)^{k_2} \bmod p$$

$$b_2 = (k_2)^{-1}(c_2 - a_2 x_1) \bmod p-1$$

wherein:
   $(a_2, b_2)$ is said response,
   $c_2$ is said challenge,
   $k_2$ is a randomly generated integer,
   $y_2$ is said second party's public key,
   $y_r$ is the recovery agent's public key,
   $x_1$ is the first party's private key, and
   $p$ is a large public prime number.

32. The method of claim 20, wherein said step of interactively providing verification information comprises the steps of:
   performing a first challenge-response El Gamal digital signature protocol, said first challenge-response including the steps of:
   receiving a first challenge;
   determining a first response according to the following relationship:

$$a_1 = (y_2/y_r)^{k_1} \bmod p$$

$$b_1 = (k_1)^{-1}(c_1 - a_1 x_1) \bmod p-1$$

wherein:
   $(a_1, b_1)$ is said first response,
   $c_1$ is said first challenge,
   $k_1$ is a first randomly generated integer,
   $y_2$ is said second party's public key,
   $y_r$ is the recovery agent's public key,
   $x_1$ is the first party's private key, and
   $p$ is a large public prime number, and
   sending said first response; and
   performing a second challenge-response El Gamal digital signature protocol, said second challenge-response including the steps of:
   receiving a second challenge,
   determining a second response according to the following relationship:

$$a_2 = \left(\frac{y_2}{y_r g}\right)^{k_2} \bmod p$$

$$b_2 = (k_2)^{-1}(c_2 - a_2 x_1) \bmod p-1$$

wherein:
   $(a_2, b_2)$ is said second response,
   $c_2$ is said second challenge,
   $k_2$ is a second randomly generated integer,
   $y_2$ is said second party's public key,
   $y_r$ is the recovery agent's public key, $x_1$ is the first party's private key, and p is a large public prime number, and sending said second response, wherein said first response and said second response comprise at least a portion of said verification information.

33. The method of claim 11, further comprising the step of:

verifying, using said verification information, that the key can be recovered by the recovery agent from the recovery information.

34. The method of claim 33, wherein said step of verifying comprises the steps of:

determining a verification result according to the following verification relationship:

$$V=v_1|v_2$$

wherein:

$$v_1 = t^{a_1} a_1^{b_1} - (y_2/y_r)^{c_1} \bmod p \quad v_2 = (t/y_1)^{a_2} a_2^{b_2} - (y_2/y_r g)^{c_2} \bmod p$$

V is said verification result, $(a_1, b_1)$ is said first response, $(a_2, b_2)$ is said second response, $c_1$ is said first challenge, $c_2$ is said second challenge, t is said recovery information, $y_1$ is said first party's public key, $y_2$ is said second party's public key, $y_r$ is the recovery agent's public key, p is a large public prime number, and verifying that said key can be recovered from said recovery information if said verification result is zero.

35. The method of claim 1, wherein said step of providing verification information comprises the step of:

non-interactively providing verification information that verifies that the key can be recovered from said recovery information without revealing private information.

36. The method of claim 35, wherein said step of non-interactively providing verification information comprises the step of:

performing anon-interactive challenge-response digital signature protocol.

37. The method of claim 35, wherein said step of non-interactively providing verification information comprises the steps of:

performing a first non-interactive challenge-response digital signature protocol; and performing a second non-interactive challenge-response digital signature protocol.

38. The method of claim 35, wherein said step of non-interactively providing verification information comprises the steps of:

performing a first non-interactive challenge-response El Gamal digital signature protocol; and performing a second non-interactive challenge-response El Gamal digital signature protocol.

39. The method of claim 38, wherein said step of performing a first non-interactive challenge-response comprises the steps of:

determining a challenge;

generating a hash of said challenge;

determining a response based on said challenge and said recovery information; and providing said challenge, said hash, and said response as at least a portion of said verification information.

40. The method of claim 39, wherein said step of determining a challenge comprises the step of:

generating a random integer.

41. The method of claim 39, wherein said step of determining a response comprises the step of:

determining said response based on said recovery information, said second party's public key, the recovery agent's public key, and said challenge.

42. The method of claim 39, wherein said step of determining a response comprises the step of:

determining said response according to the following relationship:

$$a_1 = (y_2/y_r)^{k_1} \bmod p$$

$$b_1 = (k_1)^{-1}(c_1 - a_1 x_1) \bmod p-1$$

wherein:

$(a_1, b_1)$ is said response, $c_1$ is said hash of said challenge, $k_1$ is a randomly generated integer, $y_2$ is said second party's public key, $y_r$ is the recovery agent's public key, $x_1$ is the first party's private key, and p is a large public prime number.

43. The method of claim 38, wherein said step of performing a second non-interactive challenge-response comprises the steps of:

determining a challenge;

generating a hash of said challenge;

determining a response based on said challenge and said recovery information; and providing said challenge, said hash, and response as at least a portion of said verification information.

44. The method of claim 43, wherein said step of determining a challenge comprises the step of:

generating a random integer.

45. The method of claim 43, wherein said step of determining a response comprises the step of:

determining said response based on said recovery information, said second party's public key, the recovery agent's public key, and said challenge.

46. The method of claim 43, wherein said step of determining a response comprises the step of:

determining said response according to the following relationship:

$$a_2 = \left(\frac{y_2}{y_r g}\right)^{k_2} \bmod p$$

$$b_2 = (k_2)^{-1}(c_2 - a_2 x_1) \bmod p-1$$

wherein:

$(a_2, b_2)$ is said response, $c_2$ is said hash of said challenge, $k_2$ is a randomly generated integer, $y_2$ is said second party's public key, $y_r$ is the recovery agent's public key, $x_1$ is the first party's private key, and p is a large public prime number.

47. The method of claim 35, wherein said step of non-interactively providing verification information comprises the steps of:

performing a first non-interactive challenge-response El Gamal digital signature protocol, said first challenge-response including the steps of:
determining a first challenge,
generating a first hash of said first challenge,
determining a first response according to the following relationship:

$$a_1 = (y_2/y_r)^{k_1} \bmod p$$

$$b_1 = (k_1)^{-1}(c_1 - a_1 x_1) \bmod p-1$$

wherein:
($a_1$, $b_1$) is said first response,
$c_1$ is said first hash of said first challenge,
$k_1$ is a first randomly generated integer,
$y_2$ is said second party's public key,
$y_r$ is the recovery agent's public key,
$x_1$ is the first party's private key, and
p is a large public prime number, and
providing said first challenge, said first hash, and said first response as a first portion of said verification information; and performing a second non-interactive challenge-response El Gamal digital signature protocol, said second challenge-response including the steps of:
determining a second challenge,
generating a second hash of said second challenge,
determining a second response according to the following relationship:

$$a_2 = \left(\frac{y_2}{y_r g}\right)^{k_2} \bmod p$$

$$b_2 = (k_2)^{-1}(c_2 - a_2 x_1) \bmod p-1$$

wherein:
($a_2$, $b_2$) is said second response,
$c_2$ is said second hash of said second challenge,
$k_2$ is a second randomly generated integer,
$y_2$ is said second party's public key,
$y_r$ is the recovery agent's public key,
$x_1$ is the first party's private key, and
p is a large public prime number, and
providing said challenge, said hash, and said second response as a second portion of said verification information.

48. The method of claim 13, further comprising the step of:
verifying, using said verification information, that the key can be recovered by the recovery agent from said recovery information.

49. The method of claim 13, wherein said step of verifying comprises the steps of:
verifying that said first hash was generated from said first challenge;
verifying that said second hash was generated from said second challenge;
determining a verification result according to the following verification relationship:

$$V = v_1 | v_2$$

wherein:

$$v_1 = t^{a_1} a_1^{b_1} - (y_2/y_r)^{c_1} \bmod p$$

$$v_2 = (t/y_1)^{a_2} a_2^{b_2} - (y_2/y_r g)^{c_2} \bmod p$$

V is said verification result,
($a_1$, $b_1$) is said first response,
($a_2$, $b_2$) is said second response,
$c_1$ is said first hash of said first challenge,
$c_2$ is said second hash of said second challenge,
t is said recovery information,
$y_1$ is said first party's public key,
$y_2$ is said second party's public key,
$y_r$ is the recovery agent's public key,
p is a large public prime number, and
verifying that the key can be recovered from said recovery information if said verification result is zero.

50. A method for publicly verifying that information accompanying a message encrypted by a key determined in accordance with a Diffie-Hellman key exchange includes information for recovering the key, the method comprising:
receiving recovery information determined from a public key associated with the recovery agent, a public key associated with a second party to the message, and a private key associated with a first party; and
receiving public verification information that verifies said recovery information without revealing private information.

51. The method of claim 50, wherein said step of receiving verification information comprises the step of:
interactively receiving verification information that verifies said recovery information without revealing private information.

52. The method of claim 50, wherein said step of receiving verification information comprises the step of:
non-interactively receiving verification information that verifies said recovery information without revealing private information.

53. A method for publicly verifying that information accompanying a message encrypted by a key determined in accordance with a Diffie-Hellman key exchange includes information for recovering the key, the method comprising:
providing recovery information determined from a public key associated with the recovery agent, a public key associated with a second party to the message, and a private key associated with a first party; and
providing public verification information that verifies said recovery information without revealing private information.

54. The method of claim 53, wherein said step of providing verification information comprises the step of:
interactively providing verification information that verifies said recovery information without revealing private information.

55. The method of claim 53, wherein said step of providing verification information comprises the step of:
non-interactively providing verification information that verifies said recovery information without revealing private information.

* * * * *

UNITED STATES PATENT AND TRADEMARK OFFICE
CERTIFICATE OF CORRECTION

PATENT NO.    : 6,249,585 B1
DATED         : June 19, 2001
INVENTOR(S)   : David A. McGrew, David W. Carman Page 1 of 1

It is certified that error appears in the above-identified patent and that said Letters Patent is hereby corrected as shown below:

<u>Title page,</u>
Item [22] Filed line, replace "1997" with -- 1998 --;
Item [74] *Attorney, Agent, or Firm* line, replace "Coolet" with -- Cooley --;

<u>Column 5,</u>
Line 26, replace "yis" with -- $y_a$ is --;

<u>Column 14,</u>
Line 4, replace "$a_x$" with -- $a_2$ --;
Line 67, replace "$v_q$" with -- $v_1$ --;

<u>Column 33,</u>
Line 20, replace "$v_1 = t^{a_1} a_1^{b_1} - (y_2/y_r)^{c_1} \mod p \quad v_2 = (t/y_1)^{a_2} a_2^{b_2} - (y_2/y_r g)^{c_2} \mod p$"
with the following:
$$v_1 = t^{a_1} a_1^{b_1} - (y_2/y_r)^{c_1} \mod p$$
$$v_2 = (t/y_1)^{a_2} a_2^{b_2} - (y_2/y_r g)^{c_2} \mod p$$

<u>Column 33,</u>
Line 44, replace "anon-interactive" with -- a non-interactive --; and <u>Column 35,</u>
Line 62, replace "of claim 13" with -- of claim 48 --.

Signed and Sealed this

Nineteenth Day of March, 2002

Attest:

JAMES E. ROGAN
*Director of the United States Patent and Trademark Office*

*Attesting Officer*